(12) United States Patent
Yanagisawa

(10) Patent No.: US 12,411,399 B2
(45) Date of Patent: Sep. 9, 2025

(54) PROJECTION SYSTEM AND PROJECTOR

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 426 days.

(21) Appl. No.: 18/156,451

(22) Filed: Jan. 19, 2023

(65) Prior Publication Data

US 2023/0236491 A1    Jul. 27, 2023

(30) Foreign Application Priority Data

Jan. 19, 2022 (JP) ................... 2022-006175

(51) Int. Cl.
    *G03B 21/28*    (2006.01)
    *G02B 13/16*    (2006.01)

(52) U.S. Cl.
    CPC ............. *G03B 21/28* (2013.01); *G02B 13/16* (2013.01)

(58) Field of Classification Search
    CPC ........ G02B 13/18; G02B 13/16; G02B 17/08; G02B 17/0844; G02B 17/0812; G02B 17/0852; G02B 17/0848; G02B 17/0828; G03B 21/10; G03B 21/28

See application file for complete search history.

(56) References Cited

U.S. PATENT DOCUMENTS

| | | | |
|---|---|---|---|
| 9,946,144 B2 | 4/2018 | Abe et al. | |
| 2014/0204351 A1* | 7/2014 | Matsuo | G02B 13/16 |
| | | | 353/98 |
| 2014/0268073 A1* | 9/2014 | Takano | G03B 21/28 |
| | | | 353/98 |
| 2018/0173088 A1* | 6/2018 | Minefuji | G02B 13/16 |
| 2019/0285972 A1* | 9/2019 | Minefuji | G03B 21/142 |

FOREIGN PATENT DOCUMENTS

| | | |
|---|---|---|
| JP | 2008-165187 A | 7/2008 |
| JP | 2020-034690 A | 3/2020 |

* cited by examiner

*Primary Examiner* — Pascal M Bui Pho
(74) *Attorney, Agent, or Firm* — Oliff PLC

(57) ABSTRACT

A projection system includes a first and second optical system arranged from a reduction side toward an enlargement side. The second optical system includes an optical element having a concave reflection surface and a first lens having negative power, the optical element and first lens arranged from reduction side toward enlargement side. The projection system satisfies the following expressions:

$$TR \leq 0.3 \qquad (1)$$

$$35 \leq (OAL/imy) \times (LL/imy) \times TR \times (1/NA) \leq 60 \qquad (2)$$

OAL represents an axial inter-surface spacing from an image formation device to the reflection surface, imy represents a first distance from an optical axis to the largest image height at the image formation device, LL represents the largest radius of the first lens, TR represents a throw ratio, and NA represents the numerical aperture of the image formation device.

7 Claims, 21 Drawing Sheets

PROJECTION SYSTEM AND PROJECTOR

The present application is based on, and claims priority from JP Application Serial Number 2022-006175, filed Jan. 19, 2022, the disclosure of which is hereby incorporated by reference herein in its entirety.

BACKGROUND

1. Technical Field

The present disclosure relates to a projection system and a projector.

2. Related Art

JP-A-2020-34690 describes a projector in which a projection system enlarges a projection image displayed at an image display device and projects the enlarged projection image onto a screen. The projection system includes a first refractive optical system, a reflective optical system, and a second refractive optical system sequentially arranged from the reduction side toward the enlargement side. The first refractive optical system includes a plurality of refractive lenses. The reflective optical system includes a concave mirror and reflects beams from the first refractive optical system toward the side facing the image display device in directions that intersect with the optical axis of the first refractive optical system. The second refractive optical system is formed of a single refractive lens. The refractive lens is an enlargement-side lens located at a position closest to the enlargement side in the projection system. Beams from the concave mirror enter the enlargement-side lens in directions that intersect with the optical axis of the enlargement-side lens.

Out of the examples of the projection system disclosed in JP-A-2020-34690, the projection system having the shortest projection distance has a projection distance of 257.6 mm. The enlargement-side lens of the thus configured projection system has an effective radius of 79.7 mm. The thus configured projection system further has a throw ratio of 0.154.

A projector including a projection system having a smaller throw ratio has a shorter projection distance over which the projector projects an enlarged image having a predetermined size. A projection system incorporated in a projector used indoors or at similar locations therefore needs to have a short focal length that provides a throw ratio smaller than or equal to 0.3.

A projection system having a shorter focal length tends to produce larger amounts of aberrations at the enlargement side. It is therefore necessary to increase the effective radius of the enlargement-side lens, through which the beams from the concave mirror obliquely pass, to allow the enlargement-side lens to correct the beams on an image height basis. When the size of the enlargement-side lens is increased to provide a sufficient effective radius, however, the amount of protrusion by which the enlargement-side lens protrudes radially from the first optical axis of the first refractive optical system increases, resulting in an increase in the diameter of the entire projection system. The size of the projector that incorporates the projection system is therefore not reduced.

SUMMARY

To solve the problem described above, a projection system according to an aspect of the present disclosure is a projection system for enlarging a projection image formed by an image formation device disposed in a reduction-side conjugate plane and projecting the enlarged image in an enlargement-side conjugate plane. The projection system includes a first optical system and a second optical system sequentially arranged from the reduction side toward the enlargement side. The first optical system includes a diaphragm. The second optical system includes an optical element having a concave reflection surface and a first lens having negative power, the optical element and the first lens sequentially arranged from the reduction side toward the enlargement side. An intermediate image conjugate with the reduction-side conjugate plane and the enlargement-side conjugate plane is formed between the first optical system and the second optical system. A portion at the reduction side of the first optical system forms a telecentric portion. The projection system satisfies all Conditional Expressions (1) and (2) below, $$TR \leq 0.3 \tag{1}$$

$$35 \leq (OAL/imy) \times (LL/imy) \times TR \times (1/NA) \leq 60 \tag{2}$$

where OAL represents an axial inter-surface spacing from the image formation device to the reflection surface, imy represents a first distance from an optical axis to a largest image height at the image formation device, LL represents a largest radius of the first lens, TR represents a throw ratio that is a quotient of division of a projection distance by a second distance from the optical axis to a largest image height of the enlarged image, and NA represents a numerical aperture of the image formation device.

A projector according to another aspect of the present disclosure includes the projection system described above and the image formation device that forms a projection image in the reduction-side conjugate plane of the projection system.

DESCRIPTION OF EXEMPLARY EMBODIMENTS

An optical system and a projector according to an embodiment of the present disclosure will be described below with reference to the drawings.

Projector

Figure 1:
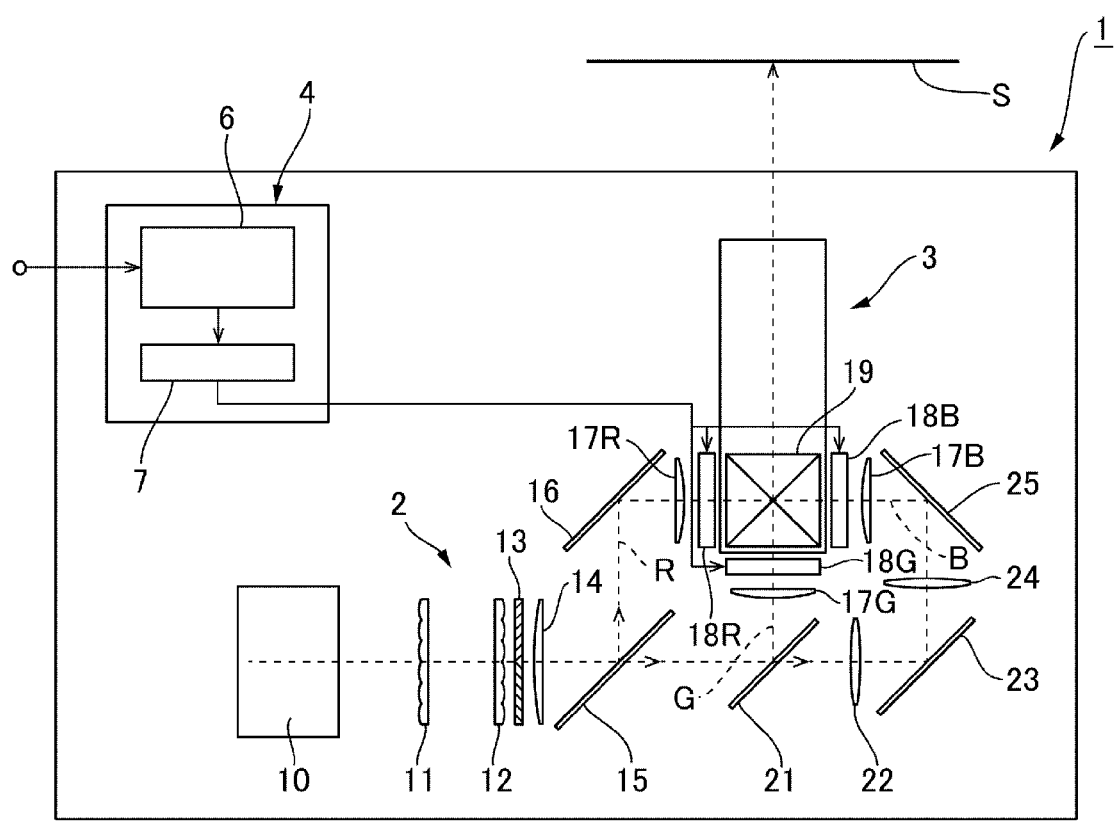
FIG. 1 shows a schematic configuration of a projector including a projection system according to an embodiment of the present disclosure.

FIG. 1 shows a schematic configuration of a projector including a projection system 3 according to the embodiment of the present disclosure. A projector 1 includes an image formation unit 2, which generates a projection image to be projected onto a screen S, the projection system 3, which enlarges the projection image and projects the enlarged image onto the screen S, and a controller 4, which controls the operation of the image formation unit 2, as shown in FIG. 1.

Image Formation Unit and Controller

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light from the second optical integration lens 12 into predetermined linearly polarized light. The superimposing lens 14 superimposes images of the lens elements of the first optical integration lens 11 on one another in a display area of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beams incident via the superimposing lens 14, and transmits G light and B light, which are part of the beams incident via the superimposing lens 14. The R light reflected off the first dichroic mirror 15 travels via the reflection mirror 16 and the field lens 17R and is incident on the liquid crystal panel 18R. The liquid crystal panel 18R is an image formation element. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beams via the first dichroic mirror 15, and transmits the B light, which is part of the beams via the first dichroic mirror 15. The G light reflected off the second dichroic mirror 21 passes through the field lens 17G and is incident on the liquid crystal panel 18G. The liquid crystal panel 18G is an image formation element. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image formation element. The liquid crystal panel 18B modulates the B light in accordance with an image signal to form a blue projection image.

The liquid crystal panels 18R, 18G, and 18B surround the cross dichroic prism 19 so as to face three sides of the cross dichroic prism 19. The cross dichroic prism 19 is a prism for light combination and produces a projection image that is the combination of the light modulated by the liquid crystal panel 18R, the light modulated by the liquid crystal panel 18G, and the light modulated by the liquid crystal panel 18B.

The projection system 3 enlarges the combined projection image from the cross dichroic prism 19 and projects the enlarged projection image onto the screen S.

The control unit 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of a color corresponding to the image signal. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

The projection system 3 will next be described. The screen S is disposed in the enlargement-side conjugate plane of the projection system 3, as shown in FIG. 1. The liquid crystal panels 18R, 18G, and 18B are disposed in the reduction-side conjugate plane of the projection system 3.

Examples 1 to 4 will be described below as examples of the configuration of the projection system 3 incorporated in the projector 1.

Example 1

Figure 2:
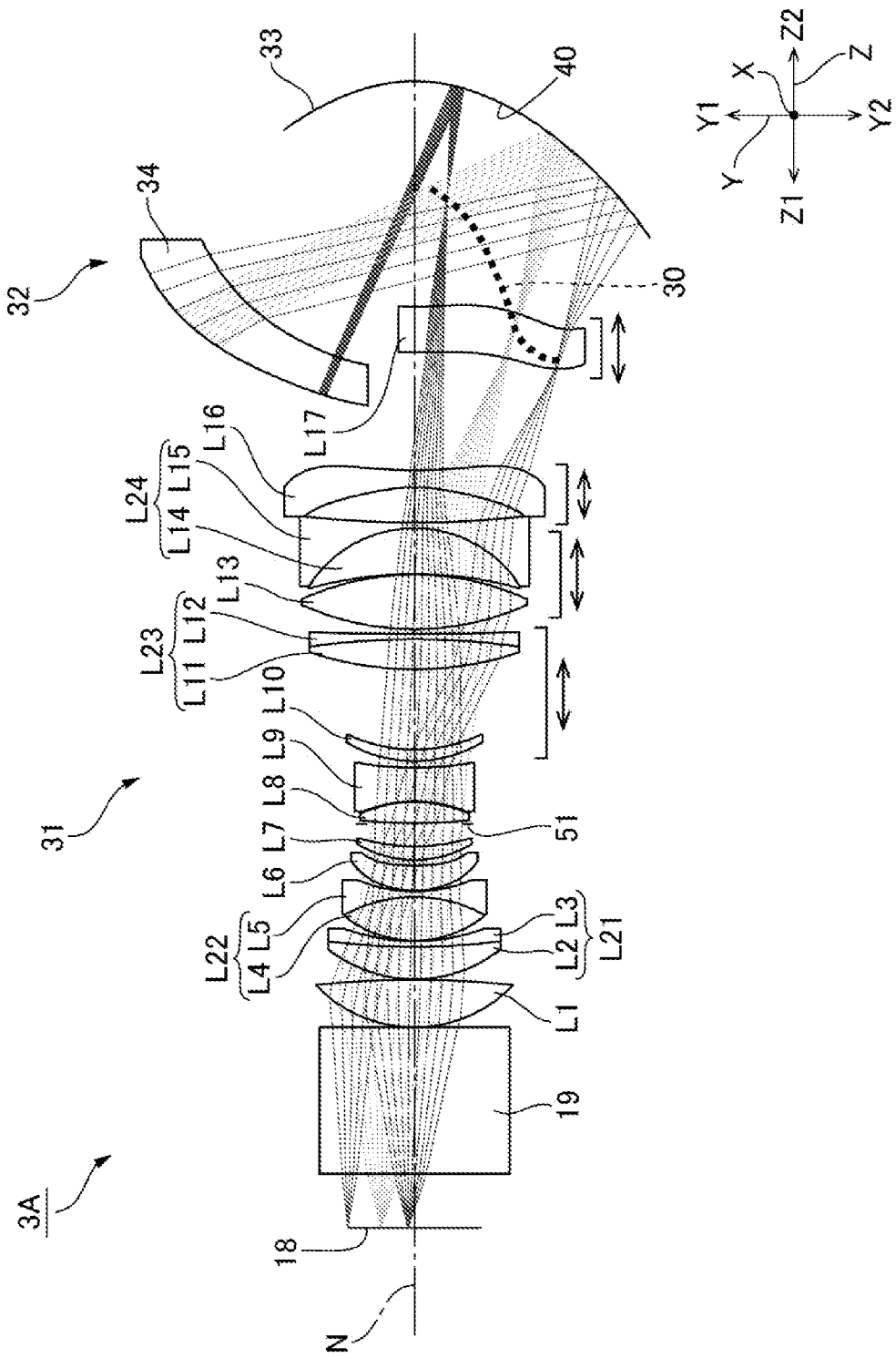
FIG. 2 is a beam diagram showing beams passing through the projection system according to Example 1.

FIG. 2 is a beam diagram showing beams passing through a projection system 3A according to Example 1. In the beam diagrams for the projection systems 3 according to Examples 1 to 4, the liquid crystal panels 18R, 18G, and 18B are referred to as a liquid crystal panel 18. The projection system 3A according to the present example is formed of a first optical system 31 and a second optical system 32 sequentially arranged from the reduction side toward the enlargement side, as shown in FIG. 2. The second optical system 32 is disposed on an optical axis N of the first optical system 31.

In the following description, three axes perpendicular to one another are called axes X, Y, and Z for convenience. The axis Z coincides with the optical axis N of the first optical system 31. The direction along the optical axis N is an axis-Z direction. The axis-Z direction toward the side where the first optical system 31 is located is called a first direction Z1, and the axis-Z direction toward the side where the second optical system 32 is located is called a second direction Z2. The axis Y extends along the screen S. The upward-downward direction is an axis-Y direction, with one side of the axis-Y direction called an upper side Y1 and the other side of the axis-Y direction called a lower side Y2. The axis X extends in the width direction of the screen.

The first optical system 31 is a refractive optical system. The first optical system 31 is formed of 17 lenses L1 to L17. The lenses L1 to L17 are arranged in the presented order from the reduction side toward the enlargement side. A diaphragm 51 is disposed between the lens L7 and the lens L8.

The lens L6 has aspherical shapes at opposite sides. The lens L9 has aspherical shapes at opposite sides. The lens L16 (third lens) has aspherical shapes at opposite sides. The lens L17 (second lens) has aspherical shapes at opposite sides. The lens L2 and the lens L3 are bonded to each other into a cemented doublet L21. The lens L4 and the lens L5 are bonded to each other into a cemented doublet L22. The lens L11 and the lens L12 are bonded to each other into a cemented doublet L23. The lens L14 and the lens L15 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a reflection surface 40, which faces the reduction side. The reflection surface 40 has a concave shape recessed in the second direction Z2. The reflection surface 40 has an aspherical shape. The reflection surface 40 is located at the lower side Y2 of the optical axis N, as shown in FIG. 2. The reflection surface 40 is formed by providing the outer surface, in the first direction Z1, of the optical element 33 with a reflection coating layer (reflection layer). The reflection surface 40 reflects light at the surface, facing in the direction Z1, of the optical element 33.

The first lens 34 is located at a position shifted from the optical element 33 in the first direction Z1 and disposed at the upper side Y1 of the optical axis N. The first lens 34 has negative power. The first lens 34 has a convex enlargement-side surface and a concave reduction-side surface. The first lens 34 has aspherical shapes at opposite sides.

The liquid crystal panel 18 of the image formation unit 2 is disposed in the reduction-side conjugate plane of the projection system 3A. The screen S is disposed in the enlargement-side conjugate plane of the projection system 3A.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 40. The beams having reached the reflection surface 40 are deflected back in the first direction Z1 towards the upper side Y1. The beams deflected back by the reflection surface 40 cross the optical axis N toward the upper side Y1 and travels toward the first lens 34. The beams passing through the first lens 34 are widened by the first lens 34 and reach the screen S.

The lens L17 of the first optical system 31 is disposed between the reflection surface 40 and the first lens 34 in the direction of the optical axis N. An intermediate image 30 is formed between the lens L17 and the reflection surface 40.

In the projection system 3A, the portion at the reduction side of the first optical system 31 is a telecentric portion. The term "telecentric" means that the central beam of each luminous flux traveling between the first optical system 31 and the liquid crystal panel 18 disposed in the reduction-side conjugate plane is parallel or substantially parallel to the optical axis of the projection system.

The projection system 3A has a changeable projection distance. When the projection distance is changed, eight lenses of the first optical system 31, the lenses L10 to L17, are moved along the optical axis N for focusing. In the focusing, the lenses L10, L11, and L12 are moved as a unit. In the focusing, the lenses L13, L14, and L15 are moved also as a unit.

Data on the projection system 3A are listed below,

| | |
|---|---|
| NA | 0.3125 |
| imy | 11.7 mm |
| scy | 1463 mm |
| PD | 283.1 mm |
| M | 125 |
| TR | 0.194 |
| OAL | 203 mm |
| LL | 47.8 mm | where NA represents the numerical aperture of the liquid crystal panel 18, imy represents a first distance from the optical axis N to the largest image height at the liquid crystal panel 18, scy represents a second distance from the optical axis N to the largest image height of the enlarged image projected on the screen S, PD represents a projection distance that is the distance from the first lens 34 to the screen S, M represents a projection magnification that is the quotient of division of the second distance by the first distance, TR represents a throw ratio that is the quotient of division of the projection distance by the second distance, OAL represents the axial inter-surface spacing from the liquid crystal panel 18 to the reflection surface 40, and LL represents the largest radius of the first lens 34.

Data on the lenses of the projection system 3A are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/Reflection | C |
|---|---|---|---|---|---|---|---|
| 18 | 0 | Spherical | Infinity | 9.5000 | | Refraction | 0.0000 |
| 19 | 1 | Spherical | Infinity | 25.9100 | SBSL7_OHARA | Refraction | 13.0371 |
| | 2 | Spherical | Infinity | 0.0000 | | Refraction | 15.4259 |
| L1 | 3 | Spherical | 23.6460 | 8.4106 | SFPL51_OHARA | Refraction | 16.3497 |
| | 4 | Spherical | −163.6273 | 0.1000 | | Refraction | 16.1238 |
| L2 | 5 | Spherical | 24.1479 | 5.7206 | SFSL5_OHARA | Refraction | 14.0000 |
| L3 | 6 | Spherical | 113.0998 | 1.0000 | STIH6_OHARA | Refraction | 13.1404 |
| | 7 | Spherical | 34.7820 | 0.1000 | | Refraction | 12.2395 |
| L4 | 8 | Spherical | 19.4148 | 7.7264 | SBSL7_OHARA | Refraction | 11.6173 |
| L5 | 9 | Spherical | −25.1932 | 0.9500 | TAFD25_HOYA | Refraction | 10.9949 |
| | 10 | Spherical | 25.2418 | 0.2000 | | Refraction | 10.0083 |
| L6 | 11 | Aspherical | 16.8372 | 4.4033 | LBAL35_OHARA | Refraction | 10.1020 |
| | 12 | Aspherical | 40.5023 | 1.0000 | | Refraction | 9.1836 |
| L7 | 13 | Spherical | 19.4289 | 2.3917 | SFSL5_OHARA | Refraction | 9.1301 |
| | 14 | Spherical | 32.7745 | 4.0203 | | Refraction | 8.8594 |
| 51 | 15 | Spherical | Infinity | 0.1043 | | Refraction | 8.3951 |
| L8 | 16 | Spherical | 101.2882 | 3.7504 | STIH53_OHARA | Refraction | 8.5137 |
| | 17 | Spherical | −22.7544 | 0.1000 | | Refraction | 8.6718 |
| L9 | 18 | Aspherical | −21.2771 | 6.0000 | LLAM60_OHARA | Refraction | 8.6423 |
| | 19 | Aspherical | 103.2802 | Variable spacing 1 | | Refraction | 9.5014 |
| L10 | 20 | Spherical | 22.9132 | 2.0346 | STIM22_OHARA | Refraction | 10.9384 |
| | 21 | Spherical | 26.8895 | 14.2089 | | Refraction | 10.9386 |
| L11 | 22 | Spherical | 57.1566 | 5.3002 | STIM2_OHARA | Refraction | 16.5000 |
| L12 | 23 | Spherical | −129.3659 | 1.0000 | STIH6_OHARA | Refraction | 16.7439 |
| | 24 | Spherical | 677.5558 | Variable spacing 2 | | Refraction | 17.0582 |
| L13 | 25 | Spherical | 47.4289 | 9.6511 | STIM22_OHARA | Refraction | 18.3999 |
| | 26 | Spherical | −46.5818 | 0.1000 | | Refraction | 18.3651 |
| L14 | 27 | Spherical | −67.5767 | 8.1053 | STIL25_OHARA | Refraction | 17.8500 |
| L15 | 28 | Spherical | −21.6948 | 1.0000 | STIH6_OHARA | Refraction | 17.7177 |
| | 29 | Spherical | 170.7327 | Variable spacing 3 | | Refraction | 18.7445 |
| L16 | 30 | Aspherical | −24.7550 | 3.0000 | 'Z-E48R' | Refraction | 18.8159 |
| | 31 | Aspherical | 101.4895 | Variable spacing 4 | | Refraction | 21.3950 |
| L17 | 32 | Aspherical | 257.2804 | 8.0000 | 'Z-E48R' | Refraction | 25.6568 |
| | 33 | Aspherical | 63.8637 | Variable spacing 5 | | Refraction | 28.1976 |
| 40 | 34 | Aspherical | −28.5800 | −50.8918 | | Reflection | |
| 34 | 35 | Aspherical | 59.7480 | −7.0000 | 'Z-E48R' | Refraction | 37.2465 |
| | 36 | Aspherical | 67.7207 | Variable spacing 6 | | Refraction | 47.7801 |
| S | 37 | Spherical | Infinity | 0.0000 | | Refraction | 1985.1150 |

The projection system 3A according to the present example has a changeable projection distance selected from a standard distance, a short distance shorter than the standard distance, and a long distance longer than the standard distance. When the projection distance is changed, eight lenses of the first optical system 31, the lenses L10 to L17, are moved along the optical axis N for focusing. When the focusing is performed so as to change the projection distance from the short distance to the long distance, the lenses L10, L11, and L12 move along the optical axis N toward the enlargement side. In the same focusing operation, the lenses L13, L14, and L15 move along the optical axis N toward the enlargement side. In the same focusing operation, the lens L16 moves along the optical axis N toward the enlargement side. In the same focusing operation, the lens L17 moves along the optical axis N toward the reduction side.

The table below shows the variable spacings 1, 2, 3, 4, 5, and 6 at the projection distances where the focusing is performed. The variable spacing 1 is the axial inter-surface spacing between the lens L9 and the lens L10. The variable spacing 2 is the axial inter-surface spacing between the lens L12 and the lens L13. The variable spacing 3 is the axial inter-surface spacing between the lens L15 and the lens L16. The variable spacing 4 is the axial inter-surface spacing between the lens L16 and the lens L17. The variable spacing 5 is the axial inter-surface spacing between the lens L17 and the reflection surface 40. The variable spacing 6 is the projection distance.

| | Standard distance | Short distance | Long distance |
|---|---|---|---|
| Variable spacing 1 | 1.1069 | 0.8768 | 1.2979 |
| Variable spacing 2 | 0.8042 | 0.1000 | 1.4634 |
| Variable spacing 3 | 6.2530 | 6.4325 | 6.0906 |
| Variable spacing 4 | 20.9176 | 21.6588 | 20.1541 |
| Variable spacing 5 | 39.8875 | 39.8713 | 39.9334 |
| Variable spacing 6 | −283.0000 | −217.0000 | −401.0000 |

The aspherical coefficients are listed below.

| Surface number | S11 | S12 | S18 | S19 |
|---|---|---|---|---|
| Radius of curvature (R) | 16.8372 | 40.5023 | −21.2771 | 103.2802 |
| Conic constant (K) | 8.76367E−01 | 1.40552E+01 | −1 | −90 |
| Fourth-order | −2.95336E−06 | 8.91728E−05 | 4.09548E−05 | 7.14087E−05 |
| Sixth-order | 5.97014E−08 | 2.72315E−07 | −4.12331E−07 | −3.41490E−07 |
| Eighth-order | 7.38171E−11 | −7.34670E−10 | 1.32697E−09 | 1.10129E−09 |
| Tenth-order | | 1.42398E−11 | | |

| Surface number | S30 | S31 | S32 | S33 |
|---|---|---|---|---|
| Radius of curvature (R) | −24.7550 | 101.4895 | 257.2804 | 63.8637 |
| Conic constant (K) | 0 | 0 | 90 | 0.00000E+00 |
| Fourth-order | 9.42799E−05 | 1.68772E−05 | −4.34174E−05 | −6.79148E−05 |
| Sixth-order | −3.84902E−07 | −1.78130E−07 | 1.23752E−07 | 1.63921E−07 |
| Eighth-order | 8.80106E−10 | 3.67946E−10 | −2.74764E−10 | −2.83439E−10 |
| Tenth-order | −8.42504E−13 | −3.17825E−13 | 3.77647E−13 | 2.91903E−13 |
| Twelfth-order | | | −2.03100E−16 | −1.17046E−16 |
| Fourteenth-order | | | | 6.56482E−22 |

| Surface number | S34 | S35 | S36 |
|---|---|---|---|
| Radius of curvature (R) | −28.5800 | 59.7480 | 67.72067982 |
| Conic constant (K) | −1.00000E+00 | 2.18390E−01 | −0.004229729 |
| Fourth-order | 3.62586E−06 | 2.99552E−05 | 1.47026E−05 |
| Sixth-order | −6.05961E−09 | −9.57606E−08 | −3.80264E−08 |
| Eighth-order | 7.45065E−12 | 1.64656E−10 | 4.62847E−11 |
| Tenth-order | −5.45419E−15 | −1.61839E−13 | −3.18524E−14 |
| Twelfth-order | 2.08318E−18 | 9.28635E−17 | 1.29283E−17 |
| Fourteenth-order | −3.40484E−22 | −2.85578E−20 | −2.89715E−21 |
| Sixteenth-order | | 3.61610E−24 | 2.80551E−25 |

The projection system 3A according to the present example satisfies all Conditional Expressions (1) and (2) below, $$TR \leq 0.3 \quad (1)$$

$$35 \leq (OAL/imy) \times (LL/imy) \times TR \times (1/NA) \leq 60 \quad (2)$$

where OAL represents the axial inter-surface spacing from the liquid crystal panel 18 to the reflection surface 40, imy represents the first distance from the optical axis N to the largest image height at the liquid crystal panel 18, LL represents the largest radius of the first lens 34, TR represents the throw ratio, which is the quotient of division of the projection distance by the second distance from the optical axis N to the largest image height of the enlarged image projected on the screen S, and NA represents the numerical aperture of the liquid crystal panel 18.

Furthermore, it is more preferable that the projection system 3A satisfies all Conditional Expressions (1) and (2') below.

$$TR \leq 0.3 \quad (1)$$

$$35 \leq (OAL/imy) \times (LL/imy) \times TR \times (1/NA) \leq 53 \quad (2')$$

In the present example, the values described above are listed below.

| OAL | 203 mm |
|---|---|
| imy | 11.7 mm |
| LL | 47.8 mm |
| TR | 0.194 |
| NA | 0.3125 |

TR=0.194 is provided from the table shown above, so that Conditional Expression (1) is satisfied. (OAL/imy)×(LL/imy)×TR×(1/NA)=44 is satisfied, so that Conditional Expression (2) is satisfied.

Effects and Advantages

The projection system 3A according to the present example enlarges a projection image formed by the liquid crystal panel 18 disposed in the reduction-side conjugate plane and projects the enlarged projection image in the enlargement-side conjugate plane. The projection system 3A according to the present example includes the first optical system 31 and the second optical system 32 sequentially arranged from the reduction side toward the enlargement side. The first optical system 31 includes the diaphragm 51. The second optical system 32 includes the optical element 33, which has the concave reflection surface 40, and the first lens 34, which has negative power, sequentially arranged from the reduction side toward the enlargement side. The intermediate image 30 conjugate with the reduction-side conjugate plane and the enlargement-side conjugate plane is formed between the first optical system 31 and the second optical system 32. The portion at the reduction side of the first optical system 31 form a telecentric portion.

The projection system 3A according to the present example satisfies all Conditional Expressions (1) and (2) below, $$TR \leq 0.3 \quad (1)$$

$$35 \leq (OAL/imy) \times (LL/imy) \times TR \times (1/NA) \leq 60 \quad (2)$$

where OAL represents the axial inter-surface spacing from the liquid crystal panel 18 to the reflection surface 40, imy represents the first distance from the optical axis N to the largest image height at the liquid crystal panel 18, LL represents the largest radius of the first lens 34, TR represents the throw ratio, which is the quotient of division of the projection distance by the second distance from the optical axis N to the largest image height of the enlarged image projected on the screen S, and NA represents the numerical aperture of the liquid crystal panel 18.

The projection system 3A according to the present example satisfies Conditional Expression (1). The projection system 3 therefore has a short focal length. A projection system having a shorter focal length tends to produce larger amounts of aberrations at the enlargement side. It is therefore necessary to increase the effective radius of the enlargement-side lens, through which the beams from the concave mirror obliquely pass, to allow the enlargement-side lens to correct the beams on an image height basis. When the size of the enlargement-side lens is increased to provide a sufficient effective radius, however, the amount of protrusion by which the enlargement-side lens protrudes radially from the first optical axis of the first refractive optical system increase, resulting in an increase in the diameter of the entire projection system.

To solve the problem described above, the projection system 3A according to the present example satisfies Conditional Expression (2). Suppression of the amount of protrusion by which the first lens 34 protrudes radially from the optical axis N can therefore suppress an increase in the diameter of the entire projection system, whereby the size of the projector that incorporates the projection system 3A can be reduced. Furthermore, the effective diameter of the first lens 34 within which the beams can be corrected on an image height basis can be ensured, while the amount of protrusion by which the first lens 34 protrudes radially from the optical axis N is suppressed. That is, when (OAL/imy)×(LL/imy)×TR×(1/NA) in Conditional Expression (2) is smaller than the lower limit, the axial inter-surface spacing from the liquid crystal panel 18 to the reflection surface 40 and the lens diameter of the first lens 34 become too small relative to TR and 1/NA, so that it is difficult to correct the beams on an image height basis, and sufficient resolution of the projection system 3A is unlikely to be provided. Even when a lens that can provide sufficient resolution can be designed, the lens has a problem of low mass producibility because the lens needs to be manufactured with high molding precision. When (OAL/imy)×(LL/imy)×TR×(1/NA) in Conditional Expression (2) is greater than the upper limit, the axial inter-surface spacing from the liquid crystal panel 18 to the reflection surface 40 and the lens diameter of the first lens 34 become excessively large. That is, the amount of protrusion by which the first lens 34 protrudes radially from the optical axis N increases, resulting in an increase in the diameter of the entire projection system. The size of the projector that incorporates the projection system therefore increases.

Example 3 described in JP-A-2020-34690, which is a related-art literature, will now be examined as Comparable Example. The projection system according to Comparable Example includes a first refractive optical system, a reflective optical system, and a second refractive optical system sequentially arranged from the reduction side toward the enlargement side. The first refractive optical system includes a plurality of refractive lenses. The reflective optical system includes a concave mirror and reflects beams from the first refractive optical system toward the side facing the image display device in directions that intersect with the optical axis of the first refractive optical system. The second refractive optical system is formed of a single refractive lens. The refractive lens is an enlargement-side lens located at a position closest to the enlargement side in the projection system. Beams from the concave mirror enter the enlargement-side lens in directions that intersect with the optical axis of the enlargement-side lens. Data on Comparable Example are listed below.

| | |
|---|---|
| OAL | 256 mm |
| imy | 13.2 mm |
| LL | 79.7 mm |
| TR | 0.154 |
| NA | 0.25 |

In Comparable Example, TR=0.154. The projection system according to Comparable Example therefore satisfies Conditional Expression (1). In Comparable Example, however, (OAL/imy)×(LL/imy)×TR×(1/NA)=72. The projection system according to Comparable Example therefore does not satisfy Conditional Expression (2). Therefore, when the throw ratio is fixed in the present example and Comparative Example, the effective radius of the enlargement-side lens of the projection system according to Comparative Example is greater than the effective radius of the first lens of the projection system 3A according to the present example. That is, the entire projection system according to Comparative Example has a diameter greater than that of the entire projection system 3A according to the present example.

In the projection system 3A according to the present example, the reflection surface 40 is provided with a reflection coating layer (reflection layer). In the configuration in which the reflection surface is provided inside the optical element 33, the accuracy of the shape of the enlargement-side lens surface, at which the reflection surface is provided, depends on the accuracy of the shape of the optical element 33. That is, to improve the accuracy of the shape of the enlargement-side lens surface, the accuracy of the shape of the reduction-side lens surface also needs to be improved. In contrast, since the reflection surface 40 of the projection system 3A according to the present example is provided at the outer surface of the optical element 33, only the accuracy of the shape of the outer surface of the optical element 33 needs to be improved. The accuracy of the shape of the reflection surface 40 in the present example is therefore readily improved as compared with that in the configuration in which the reflection surface is provided inside the optical element 33.

In the configuration in which the reflection surface is provided inside the optical element 33, the optical element 33 is formed, and a reflection coating layer is then formed at the enlargement-side lens surface of the optical element 33 to form the reflection surface. In this process, a support film layer needs to be provided between the reflection coating layer and the enlargement-side lens surface. Although the thus provided support film layer causes the reflection coating layer to be unlikely to peel off the enlargement-side lens surface, the interposed support film layer tends to lower the optical performance of the reflection surface, so that the optical performance of the reflection surface tends to vary in the manufacturing process. In contrast, in the projection system 3A according to the present example, the support film layer is provided on the side opposite from the reflection surface of the reflection coating layer, whereby the optical performance of the reflection surface 40 is unlikely to deteriorate. Stable optical performance of the reflection surface 40 is therefore likely to be achieved during the manufacture of the optical element 33.

In the projection system 3A according to the present example, the lens L17 (second lens) disposed at a position closest to the enlargement side in the first optical system 31 is formed as a lens separate from the first lens 34. The lens L17 is disposed between the reflection surface 40 and the first lens 34 in the direction of the optical axis N. That is, the lens L17 disposed at a position closest to the enlargement side in the first optical system 31 is disposed inside the second optical system 32 in the direction of the optical axis N, so that the distance between the lens L17 and the reflection surface 40 decreases. The axial inter-surface spacing from the liquid crystal panel 18 to the reflection surface 40 can thus be shortened, whereby the size of the projection system 3A can be reduced. Furthermore, the intermediate image 30 is formed between the lens L17 of the first optical system 31 and the reflection surface 40 of the second optical system 32. When the distance between the lens L17 and the reflection surface 40 thus decreases, a variety of aberrations contained in the intermediate image 30 are readily corrected on an image height basis.

The first optical system 31 includes the lens L17 (second lens) and the lens L16 (third lens), which is disposed adjacent to the lens L17 and shifted therefrom toward the reduction side. The lenses L16 and L17 each have an aspherical shape. In the projection system 3A according to the present example, focusing that causes the projection distance to be changed from the short distance to the long distance is performed by moving the lenses L16 and L17 toward the enlargement side in the direction of the optical axis N. The projection system 3A, in which the lenses L16 and L17, which correct a variety of aberrations on an image height basis, are moved in the direction of the optical axis N, therefore allows suppression of occurrence of the variety of aberrations during focusing. Furthermore, in a configuration in which a lens having no aspherical shape is moved in the direction of the optical axis N for focusing, an aspherical lens that corrects a variety of aberrations needs to be separately prepared. In contrast, the present example, in which the lenses L16 and L17, which move during focusing, each have an aspherical shape, allows reduction in the size of the entire projection system.

The first optical system 31 further includes the cemented doublets L23 and L24 at the enlargement side of the diaphragm 51. The chromatic aberrations can therefore be corrected well.

Figure 3:
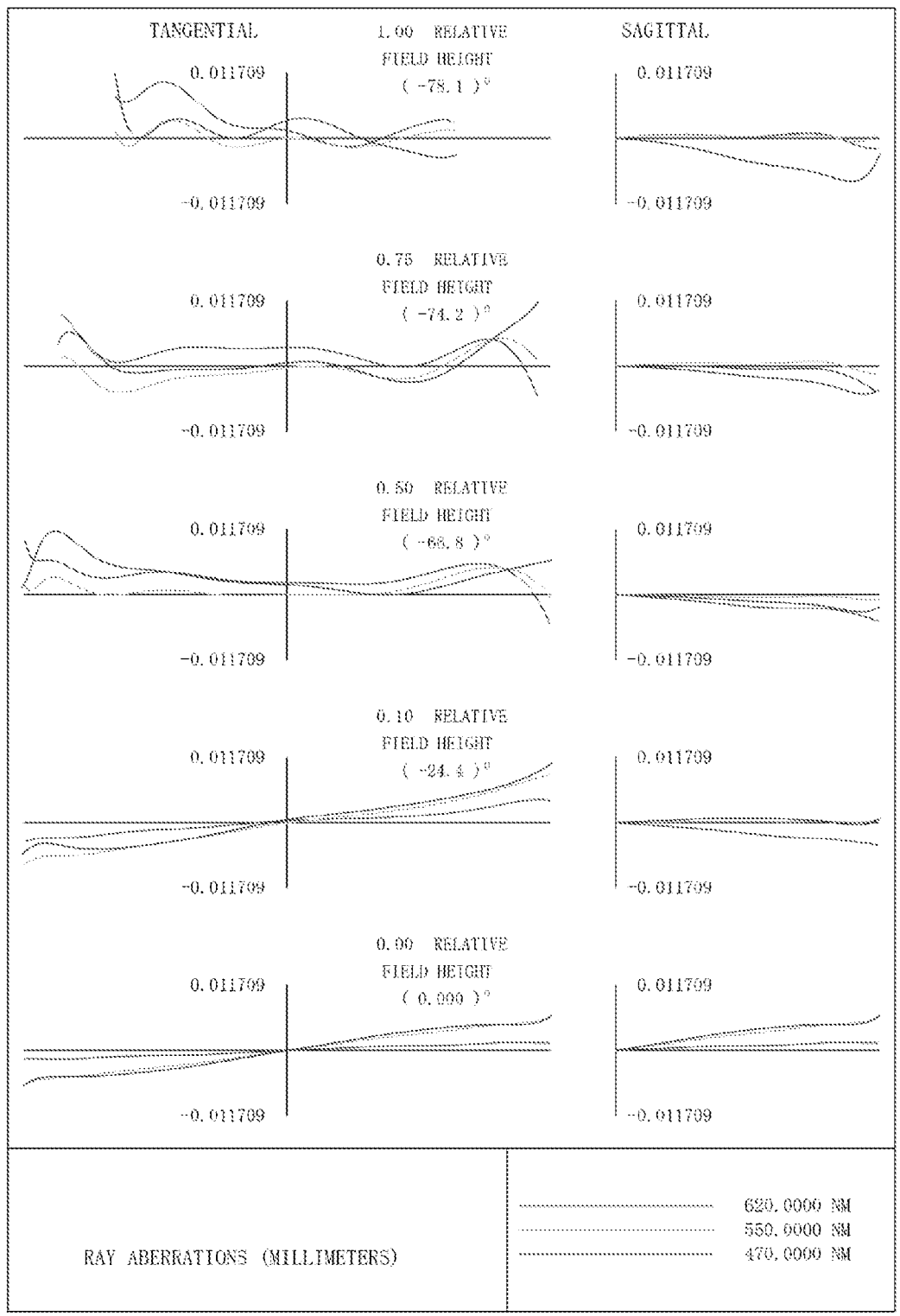
FIG. 3 shows lateral aberrations produced by the projection system according to Example 1 set at a standard distance.
Figure 4:
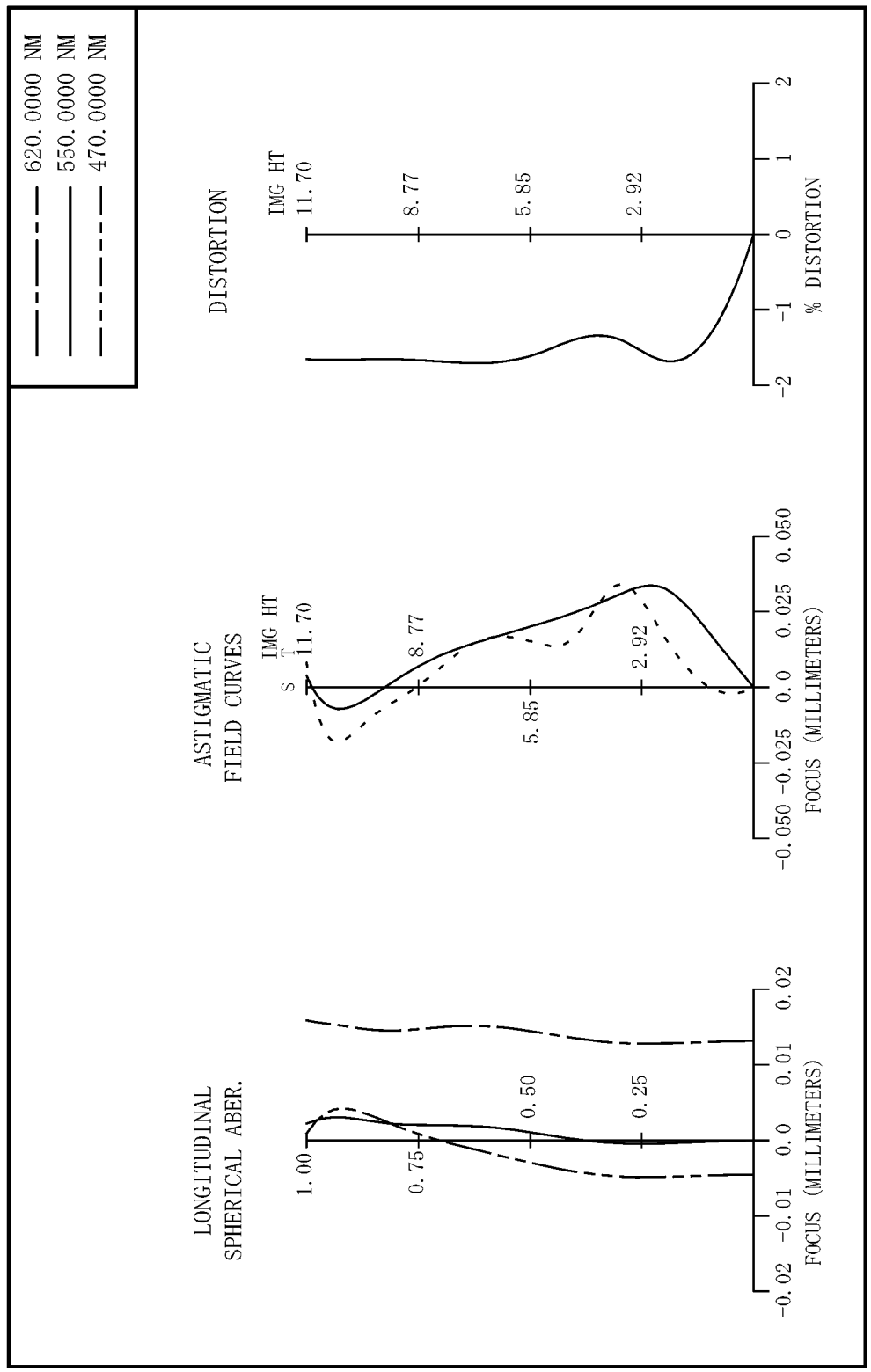
FIG. 4 shows spherical aberration, astigmatism, and distortion produced by the projection system according to Example 1 set at the standard distance.
Figure 5:
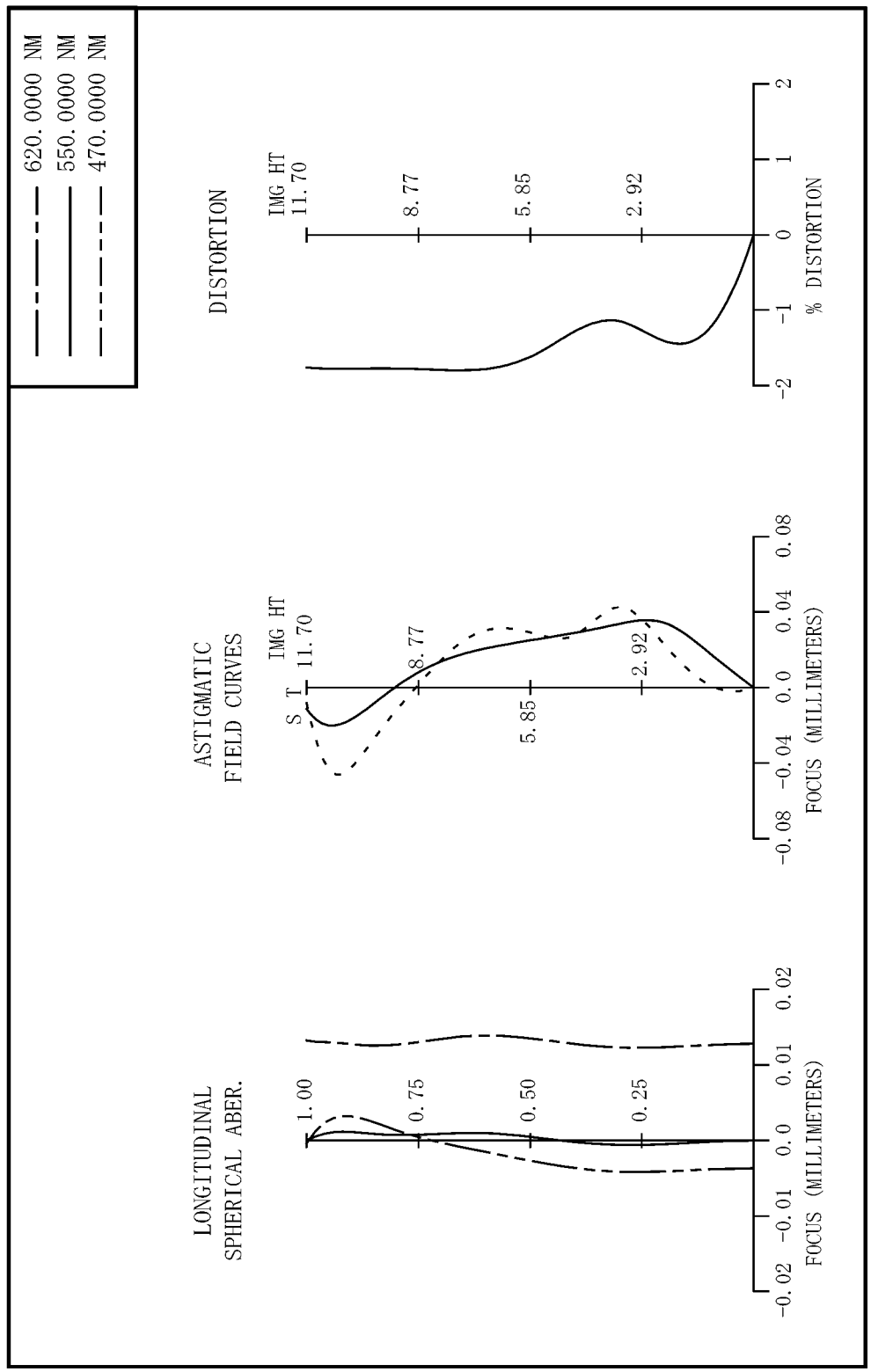
FIG. 5 shows the spherical aberration, astigmatism, and distortion produced by the projection system according to Example 1 set at a short distance.
Figure 6:
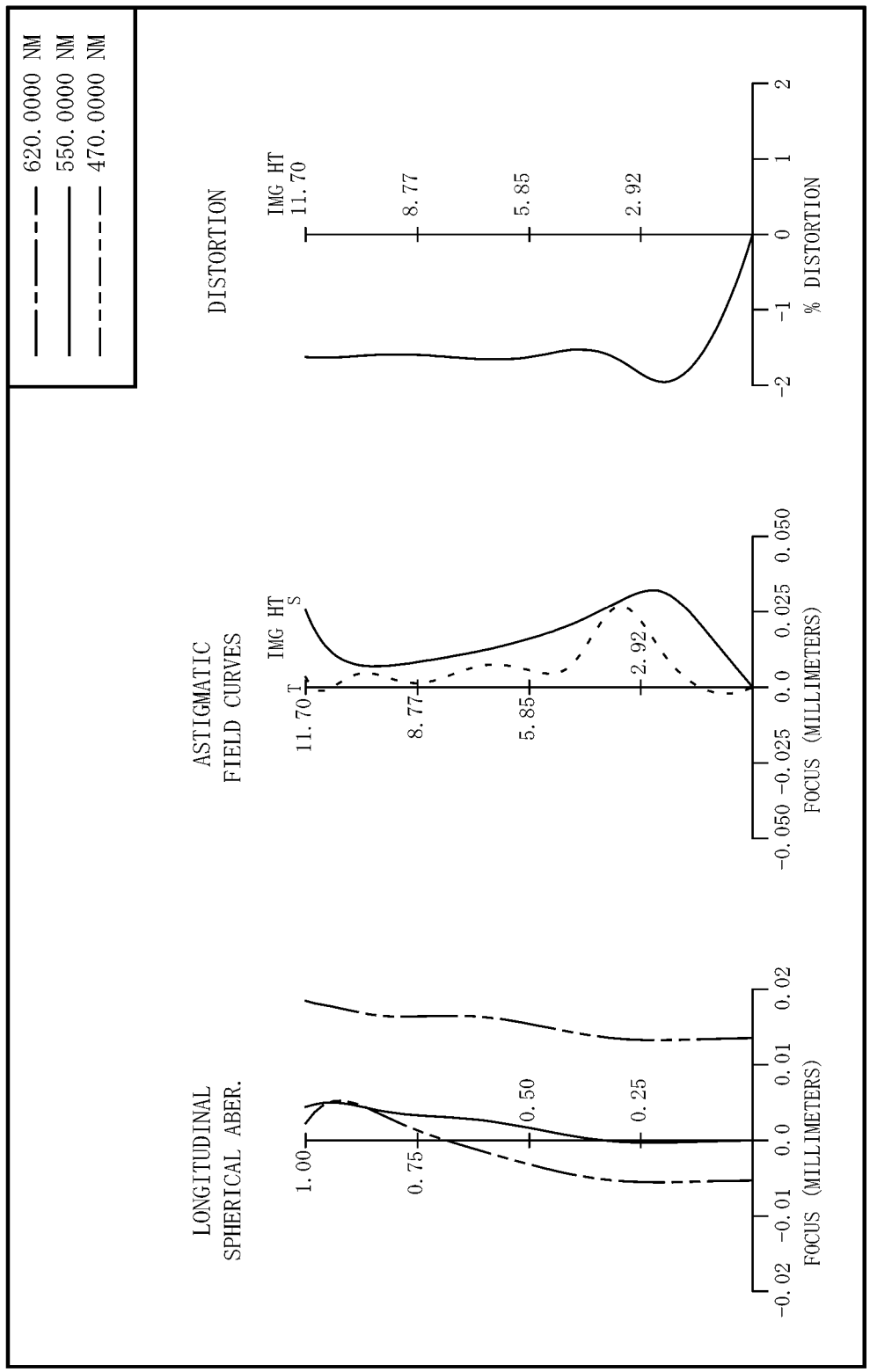
FIG. 6 shows the spherical aberration, astigmatism, and distortion produced by the projection system according to Example 1 set at a long distance.

FIG. 3 shows lateral aberrations produced by the projection system 3A set at the standard distance. FIG. 4 shows the spherical aberration, astigmatism, and distortion produced by the projection system 3A set at the standard distance. FIG. 5 shows the spherical aberration, astigmatism, and distortion produced by the projection system 3A set at the short distance. FIG. 6 shows the spherical aberration, astigmatism, and distortion produced by the projection system 3A set at the long distance. The projection system 3A according to the present example produces an enlarged image having suppressed aberrations, as shown in FIGS. 3 to 6.

Example 2

Figure 7:
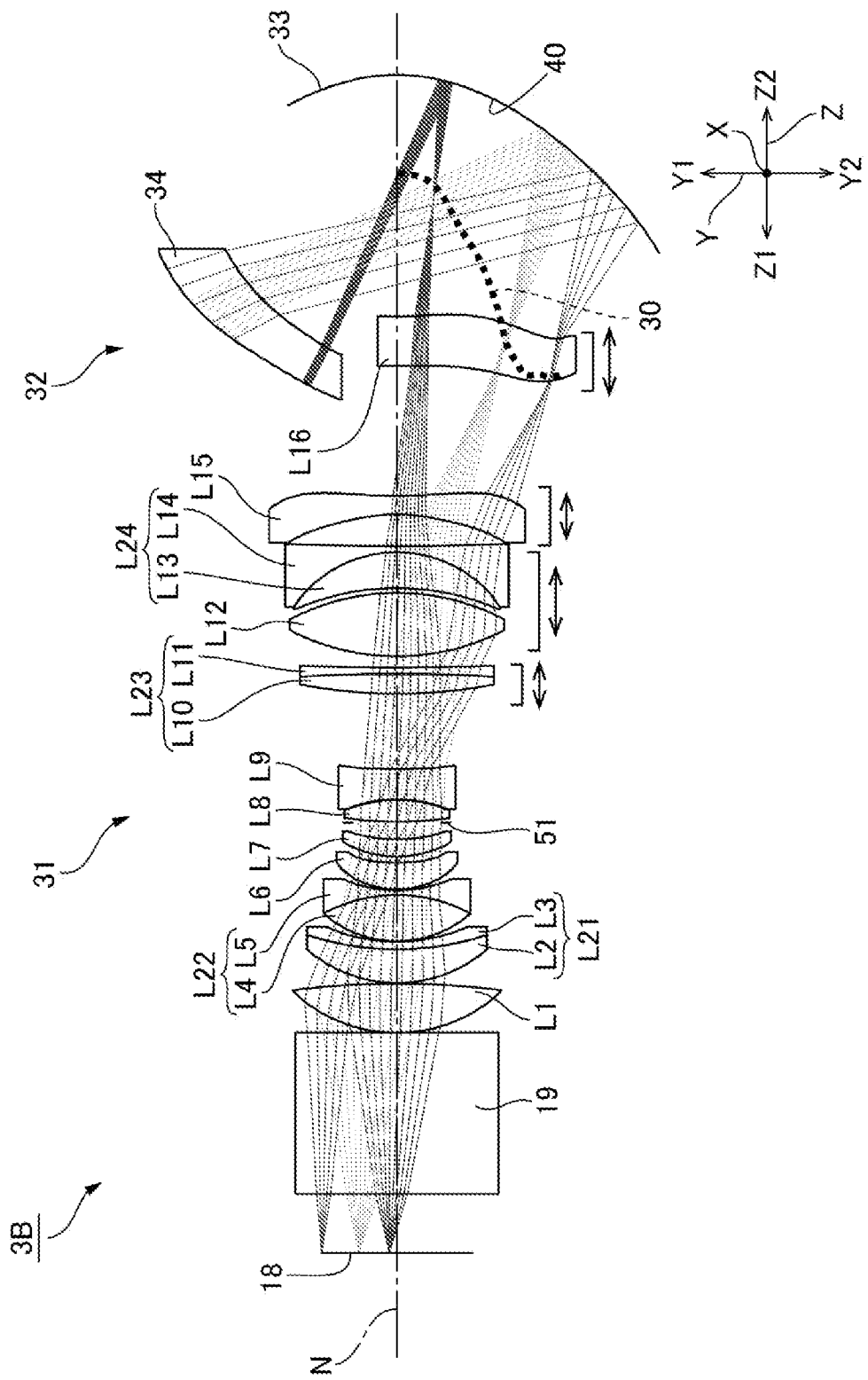
FIG. 7 is a beam diagram showing beams passing through the projection system according to Example 2.

FIG. 7 is a beam diagram showing beams passing through a projection system 3B according to Example 2. The projection system 3B according to the present example is formed of a first optical system 31 and a second optical system 32 sequentially arranged from the reduction side toward the enlargement side, as shown in FIG. 7. The second optical system 32 is disposed on an optical axis N of the first optical system 31.

The first optical system 31 is a refractive optical system. The first optical system 31 is formed of sixteen lenses L1 to L16. The lenses L1 to L16 are arranged in the presented order from the reduction side toward the enlargement side. A diaphragm 51 is disposed between the lens L7 and the lens L8.

The lens L6 has aspherical shapes at opposite sides. The lens L9 has aspherical shapes at opposite sides. The lens L15 (third lens) has aspherical shapes at opposite sides. The lens L16 (second lens) has aspherical shapes at opposite sides. The lens L2 and the lens L3 are bonded to each other into a cemented doublet L21. The lens L4 and the lens L5 are bonded to each other into a cemented doublet L22. The lens L10 and the lens L11 are bonded to each other into a cemented doublet L23. The lens L13 and the lens L14 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a reflection surface 40, which faces the reduction side. The reflection surface 40 has a concave shape recessed in the second direction Z2. The reflection surface 40 has an aspherical shape. The reflection surface 40 is located at the lower side Y2 of the optical axis N, as shown in FIG. 7. The reflection surface 40 is formed by providing the outer surface, in the first direction Z1, of the optical element 33 with a reflection coating layer (reflection layer). The reflection surface 40 reflects light at the surface, facing in the direction Z1, of the optical element 33.

The first lens 34 is located at a position shifted from the optical element 33 in the first direction Z1 and disposed at the upper side Y1 of the optical axis N. The first lens 34 has negative power. The first lens 34 has a convex enlargement-side surface and a concave reduction-side surface. The first lens 34 has aspherical shapes at opposite sides.

The liquid crystal panel 18 of the image formation unit 2 is disposed in the reduction-side conjugate plane of the projection system 3B. The screen S is disposed in the enlargement-side conjugate plane of the projection system 3B.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 40. The beams having reached the reflection surface 40 are deflected back in the first direction Z1 towards the upper side Y1. The beams deflected back by the reflection surface 40 cross the optical axis N toward the upper side Y1 and travel toward the first lens 34. The beams passing through the first lens 34 are widened by the first lens 34 and reach the screen S.

The lens L16 of the first optical system 31 is disposed between the reflection surface 40 and the first lens 34 in the direction of the optical axis N. An intermediate image 30 is formed between the lens L16 and the reflection surface 40.

In the projection system 3B, the portion at the reduction side of the first optical system 31 is a telecentric portion.

The projection system 3B has a changeable projection distance. When the projection distance is changed, seven lenses of the first optical system 31, the lenses L10 to L16, are moved along the optical axis N for focusing. In the focusing, the lenses L12, L13, and L14 are moved as a unit.

Data on the projection system 3B are listed below,

| | |
|---|---|
| NA | 0.2778 |
| imy | 11.8 mm |
| scy | 1462 mm |
| PD | 288.6 mm |
| M | 124 |
| TR | 0.197 |
| OAL | 189 mm |
| LL | 36.5 mm | where NA represents the numerical aperture of the liquid crystal panel 18, imy represents a first distance from the optical axis N to the largest image height at the liquid crystal panel 18, scy represents a second distance from the optical axis N to the largest image height of the enlarged image projected on the screen S, PD represents a projection distance that is the distance from the first lens 34 to the screen S, M represents a projection magnification that is the quotient of division of the second distance by the first distance, TR represents a throw ratio that is the quotient of division of the projection distance by the second distance, OAL represents the axial inter-surface spacing from the liquid crystal panel 18 to the reflection surface 40, and LL represents the largest radius of the first lens 34.

Data on the lenses of the projection system 3B are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/ Reflection | C |
|---|---|---|---|---|---|---|---|
| 18 | 0 | Spherical | Infinity | 9.5000 | | Refraction | 0.0000 |
| 19 | 1 | Spherical | Infinity | 25.9100 | SBSL7_OHARA | Refraction | 12.8706 |
| | 2 | Spherical | Infinity | 0.0000 | | Refraction | 14.7871 |
| L1 | 3 | Spherical | 23.3077 | 7.9094 | SFPL51_OHARA | Refraction | 15.4467 |
| | 4 | Spherical | −127.0559 | 0.1000 | | Refraction | 15.2079 |
| L2 | 5 | Spherical | 21.0056 | 5.4283 | SFPL51-OHARA | Refraction | 13.0000 |
| L3 | 6 | Spherical | 44.2633 | 1.2142 | STIH6_OHARA | Refraction | 11.8639 |
| | 7 | Spherical | 26.7444 | 0.1000 | | Refraction | 11.0399 |
| L4 | 8 | Spherical | 17.2046 | 7.4036 | SFPL51_OHARA | Refraction | 10.5313 |
| L5 | 9 | Spherical | −23.7897 | 0.7500 | TAFD25_HOYA | Refraction | 9.6431 |
| | 10 | Spherical | 20.7471 | 0.2000 | | Refraction | 8.5696 |
| L6 | 11 | Aspherical | 14.2713 | 4.2460 | LBAL35_OHARA | Refraction | 8.6504 |
| | 12 | Aspherical | 32.7925 | 1.0000 | | Refraction | 7.7784 |
| L7 | 13 | Spherical | 16.4731 | 2.7568 | SFSL5_OHARA | Refraction | 7.6827 |
| | 14 | Spherical | 23.3002 | 2.7433 | | Refraction | 7.2371 |
| 51 | 15 | Spherical | Infinity | 0.1000 | | Refraction | 6.9632 |
| L8 | 16 | Spherical | 55.5146 | 3.5141 | STIH53_OHARA | Refraction | 7.2124 |
| | 17 | Spherical | −20.4634 | 0.1000 | | Refraction | 7.4622 |
| L9 | 18 | Aspherical | −18.8417 | 4.8490 | LLAM60_OHARA | Refraction | 7.4571 |
| | 19 | Aspherical | 138.4003 | Variable spacing 1 | | Refraction | 8.3506 |
| L10 | 20 | Spherical | 77.9934 | 3.2176 | STIL25_OHARA | Refraction | 13.5492 |
| L11 | 21 | Spherical | −238.3916 | 1.0000 | STIH6_OHARA | Refraction | 13.7984 |
| | 22 | Spherical | 422.0121 | Variable spacing 2 | | Refraction | 14.0280 |
| L12 | 23 | Spherical | 35.5651 | 10.2093 | STIM22_OHARA | Refraction | 15.5000 |
| | 24 | Spherical | −34.9646 | 0.7658 | | Refraction | 15.5950 |
| L13 | 25 | Spherical | −38.6490 | 5.7518 | STIL25_OHARA | Refraction | 15.1870 |
| L14 | 26 | Spherical | −19.2778 | 1.0000 | STIH6_OHARA | Refraction | 15.1633 |
| | 27 | Spherical | 431.4628 | Variable spacing 3 | | Refraction | 16.3418 |

-continued

| Reference character | Surface number | Shape | R | D | Glass material | Refraction/ Reflection | C |
|---|---|---|---|---|---|---|---|
| L15 | 28 | Aspherical | −22.5593 | 3.0000 | 'Z-E48R' | Refraction | 16.5057 |
|  | 29 | Aspherical | 111.9646 | Variable spacing 4 |  | Refraction | 18.7911 |
| L16 | 30 | Aspherical | 245.8978 | 8.0000 | 'Z-E48R' | Refraction | 24.6934 |
|  | 31 | Aspherical | 58.0779 | Variable spacing 5 |  | Refraction |  |
| 40 | 32 | Aspherical | −28.3812 | −46.6942 |  | Reflection | 39.1428 |
| 34 | 33 | Aspherical | 33.3357 | −7.0000 | 'Z-E48R' | Refraction | 27.0468 |
|  | 34 | Aspherical | 30.6616 | Variable spacing 6 |  | Refraction | 36.2389 |
| S | 35 | Spherical | Infinity | 0.0000 |  | Refraction | 2001.4151 |

The projection system 3B according to the present example has a changeable projection distance selected from a standard distance, a short distance shorter than the standard distance, and a long distance longer than the standard distance. When the projection distance is changed, seven lenses of the first optical system 31, the lenses L10 to L16, are moved along the optical axis N for focusing. When the focusing is performed so as to change the projection distance from the short distance to the long distance, the lenses L10 and L11 move along the optical axis N toward the reduction side. In the same focusing operation, the lenses L12, L13, and L14 move along the optical axis N toward the enlargement side. In the same focusing operation, the lens L15 moves along the optical axis N toward the enlargement side. In the same focusing operation, the lens L16 moves along the optical axis N toward the enlargement side.

The table below shows the variable spacings 1, 2, 3, 4, 5, and 6 at the projection distances where the focusing is performed. The variable spacing 1 is the axial inter-surface spacing between the lens L9 and the lens L10. The variable spacing 2 is the axial inter-surface spacing between the lens L11 and the lens L12. The variable spacing 3 is the axial inter-surface spacing between the lens L14 and the lens L15. The variable spacing 4 is the axial inter-surface spacing between the lens L15 and the lens L16. The variable spacing 5 is the axial inter-surface spacing between the lens L16 and the reflection surface 40. The variable spacing 6 is the projection distance.

|  | Standard distance | Short distance | Long distance |
|---|---|---|---|
| Variable spacing 1 | 12.1167 | 13.2136 | 11.8202 |
| Variable spacing 2 | 1.8056 | 0.1000 | 2.7521 |
| Variable spacing 3 | 5.1195 | 5.3664 | 4.9687 |
| Variable spacing 4 | 20.8516 | 21.2210 | 20.3846 |
| Variable spacing 5 | 38.8253 | 38.8412 | 38.8165 |
| Variable spacing 6 | −287.0000 | −224.0000 | −403.0000 |

The aspherical coefficients are listed below.

| Surface number | S11 | S12 | S18 | S19 |
|---|---|---|---|---|
| Radius of curvature (R) | 14.2713 | 32.7925 | −18.8417 | 138.4003 |
| Conic constant (K) | 8.61373E−01 | 1.26960E+01 | −1 | −90 |
| Fourth-order | −1.78411E−05 | 1.08502E−04 | 6.36736E−05 | 9.09981E−05 |
| Sixth-order | 1.92270E−08 | 3.62039E−07 | −9.07712E−07 | −7.42228E−07 |
| Eighth-order | 8.84500E−11 | −2.22710E−09 | 3.81595E−09 | 3.02545E−09 |
| Tenth-order |  | 4.90294E−11 |  |  |

| Surface number | S28 | S29 | S30 | S31 |
|---|---|---|---|---|
| Radius of curvature (R) | −22.5593 | 111.9646 | 245.8978 | 58.0779 |
| Conic constant (K) | 0 | 0 | 90 | 0.00000E+00 |
| Fourth-order | 1.20307E−04 | 1.83761E−05 | −5.27611E−05 | −8.10795E−05 |
| Sixth-order | −6.19796E−07 | −2.79021E−07 | 1.51125E−07 | 2.09269E−07 |
| Eighth-order | 1.66495E−09 | 6.93645E−10 | −3.07259E−10 | −3.89250E−10 |
| Tenth-order | −1.73986E−12 | −6.65573E−13 | 4.39273E−13 | 4.46405E−13 |
| Twelfth-order |  |  | −2.61547E−16 | −1.98979E−16 |
| Fourteenth-order |  |  |  | 6.56482E−22 |

| Surface number | S32 | S33 | S34 |
|---|---|---|---|
| Radius of curvature (R) | −28.3812 | 33.3357 | 30.66161366 |
| Conic constant (K) | −1.00000E+00 | −5.39402E−01 | −0.60807081 |
| Fourth-order | 3.57234E−06 | 1.50335E−04 | 4.29399E−05 |
| Sixth-order | −6.79154E−09 | −9.61493E−07 | −2.02768E−07 |
| Eighth-order | 9.60704E−12 | 3.12494E−09 | 3.95931E−10 |

-continued

| | | | |
|---|---|---|---|
| Tenth-order | −7.92734E−15 | −5.89295E−12 | −4.31475E−13 |
| Twelfth-order | 3.36716E−18 | 6.57780E−15 | 2.74639E−16 |
| Fourteenth-order | −6.07598E−22 | −4.02279E−18 | −9.56386E−20 |
| Sixteenth-order | | 1.04005E−21 | 1.41923E−23 |

The projection system 3B according to the present example satisfies all Conditional Expressions (1) and (2) below, $$TR \leq 0.3 \quad (1)$$

$$35 \leq (OAL/imy) \times (LL/imy) \times TR \times (1/NA) \leq 60 \quad (2)$$

where OAL represents the axial inter-surface spacing from the liquid crystal panel 18 to the reflection surface 40, imy represents the first distance from the optical axis N to the largest image height at the liquid crystal panel 18, LL represents the largest radius of the first lens 34, TR represents the throw ratio, which is the quotient of division of the projection distance by the second distance from the optical axis N to the largest image height of the enlarged image projected on the screen S, and NA represents the numerical aperture of the liquid crystal panel 18.

Furthermore, it is more preferable that the projection system 3B satisfies all Conditional Expressions (1) and (2') below.

$$TR \leq 0.3 \quad (1)$$

$$35 \leq (OAL/imy) \times (LL/imy) \times TR \times (1/NA) \leq 53 \quad (2')$$

In the present example, the values described above are listed below.

| | |
|---|---|
| OAL | 189 mm |
| imy | 11.8 mm |
| LL | 36.5 mm |
| TR | 0.197 |
| NA | 0.2778 |

TR=0.197 is provided from the table shown above, so that Conditional Expression (1) is satisfied. (OAL/imy)×(LL/imy)×TR×(1/NA)=35 is satisfied, so that Conditional Expression (2) is satisfied.

Effects and Advantages

In the projection system 3B according to the present example, the reflection surface 40 is provided with a reflection coating layer (reflection layer). The projection system 3B according to the present example can therefore provide the same effects and advantages as those provided by Example 1.

In the projection system 3B according to the present example, the lens L16 (second lens) disposed at a position closest to the enlargement side in the first optical system 31 is formed as a lens separate from the first lens 34. The lens L16 is disposed between the reflection surface 40 and the first lens 34 in the direction of the optical axis N. That is, the lens L16 disposed at a position closest to the enlargement side in the first optical system 31 is disposed inside the second optical system 32 in the direction of the optical axis N, so that the distance between the lens L16 and the reflection surface 40 decreases. The projection system 3B according to the present example can therefore provide the same effects and advantages as those provided by Example 1.

The first optical system 31 includes the lens L16 (second lens) and the lens L15 (third lens), which is disposed adjacent to the lens L16 and shifted therefrom toward the reduction side. The lenses L15 and L16 each have an aspherical shape. In the projection system 3B according to the present example, focusing that causes the projection distance to be changed from the short distance to the long distance is performed by moving the lenses L15 and L16 toward the enlargement side in the direction of the optical axis N. The projection system 3B, in which the lenses L15 and L16, which correct a variety of aberrations on an image height basis, are moved in the direction of the optical axis N, therefore allows suppression of occurrence of the variety of aberrations during focusing. Furthermore, in a configuration in which a lens having no aspherical shape is moved in the direction of the optical axis N for focusing, an aspherical lens that corrects a variety of aberrations needs to be separately prepared. In contrast, the present example, in which the lenses L15 and L16, which move during focusing, each have an aspherical shape, allows reduction in the size of the entire projection system.

The first optical system 31 further includes the cemented doublets L23 and L24 at the enlargement side of the diaphragm 51. The chromatic aberrations can therefore be corrected well.

Figure 8:
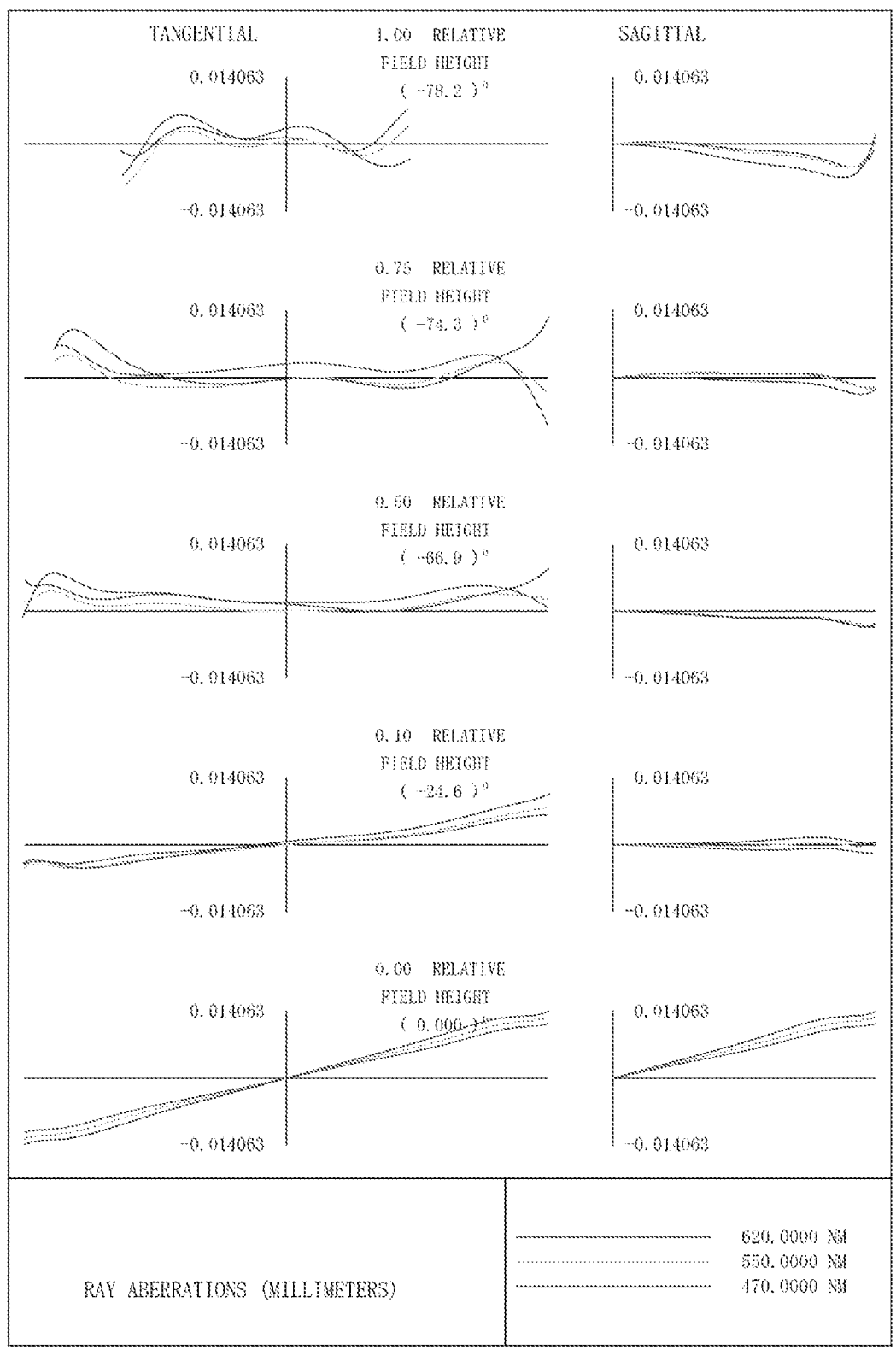
FIG. 8 shows the lateral aberrations produced by the projection system according to Example 2 set at the standard distance.
Figure 9:
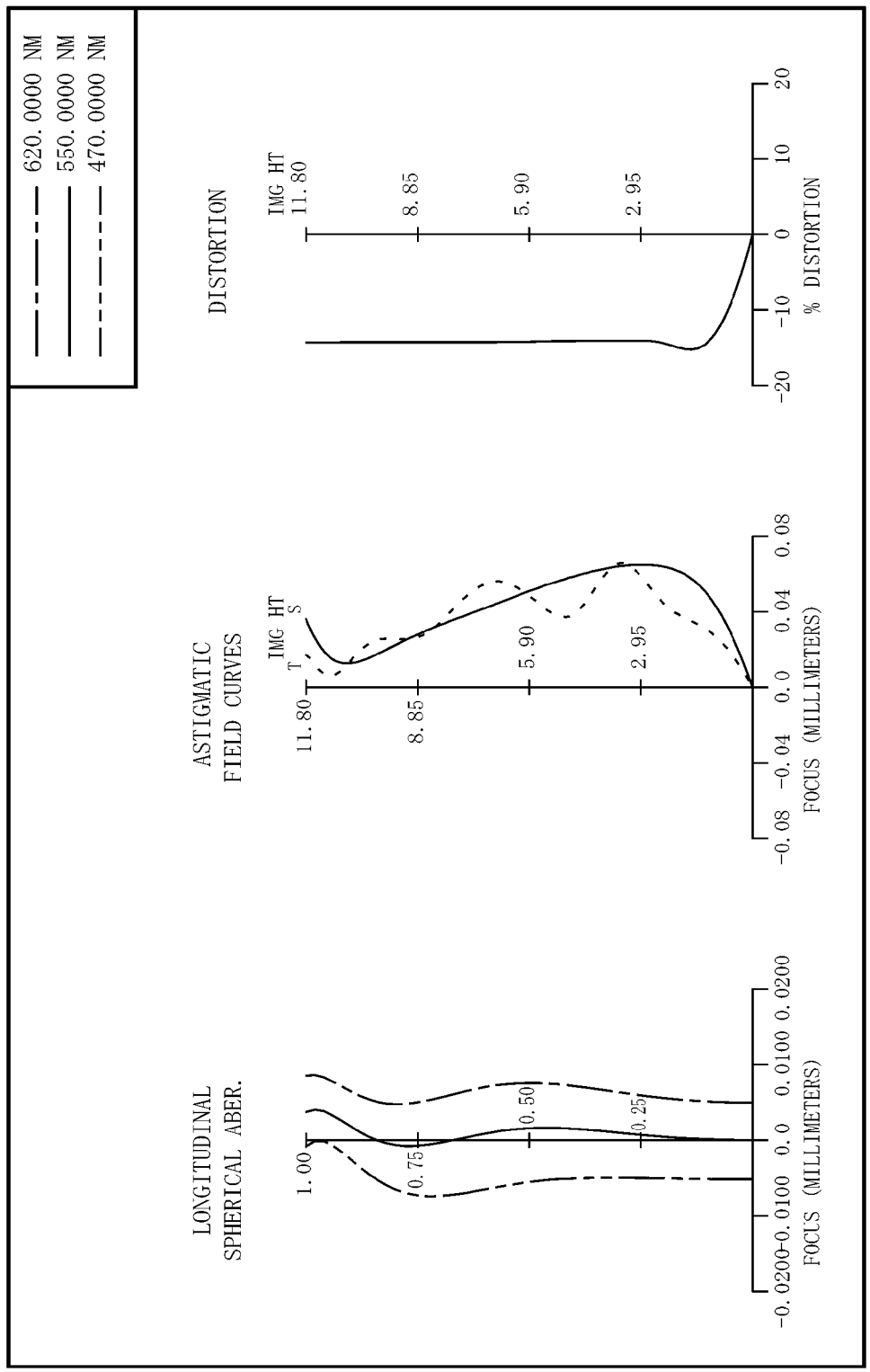
FIG. 9 shows the spherical aberration, astigmatism, and distortion produced by the projection system according to Example 2 set at the standard distance.
Figure 10:
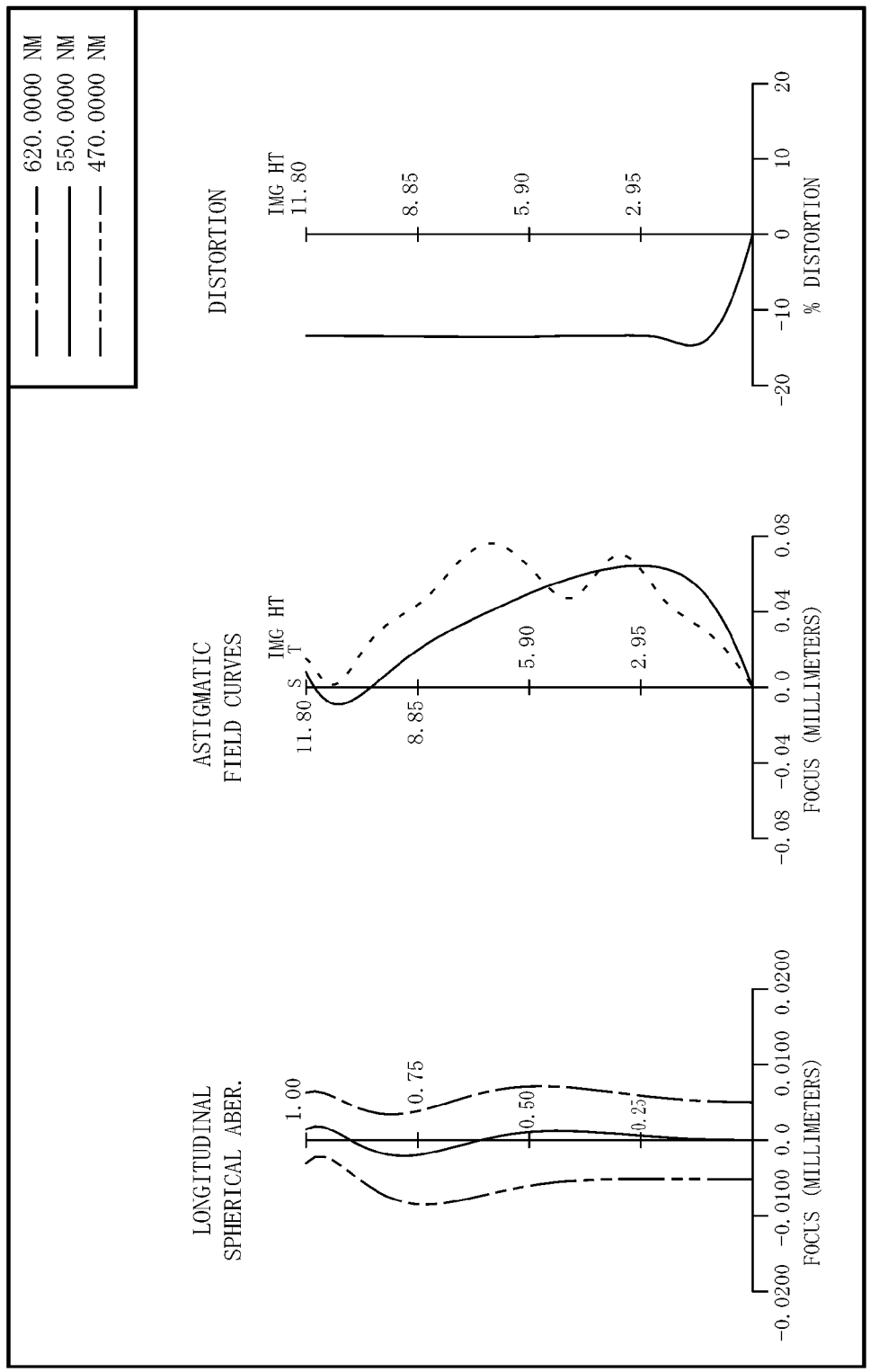
FIG. 10 shows the spherical aberration, astigmatism, and distortion produced by the projection system according to Example 2 set at the short distance.
Figure 11:
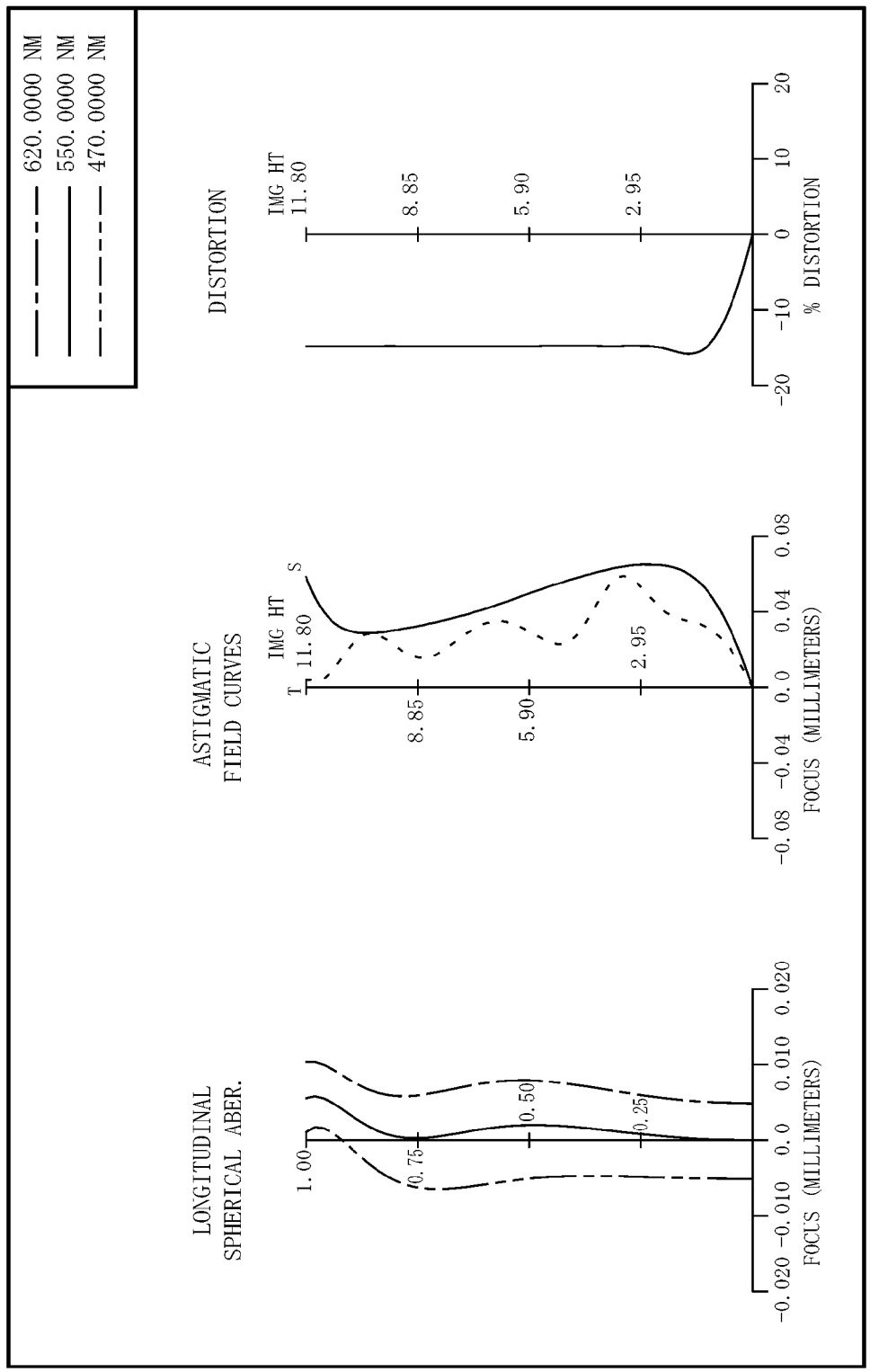
FIG. 11 shows the spherical aberration, astigmatism, and distortion produced by the projection system according to Example 2 set at the long distance.

The projection system 3B according to the present example, which satisfies Conditional Expressions (1) and (2), can provide the same effects and advantages as those provided by the projection system 3A according to Example 1. FIG. 8 shows the lateral aberrations produced by the projection system 3B set at the standard distance. FIG. 9 shows the spherical aberration, astigmatism, and distortion produced by the projection system 3B set at the standard distance. FIG. 10 shows the spherical aberration, astigmatism, and distortion produced by the projection system 3B set at the short distance. FIG. 11 shows the spherical aberration, astigmatism, and distortion produced by the projection system 3B set at the long distance. The projection system 3B according to the present example produces an enlarged image having suppressed aberrations, as shown in FIGS. 8 to 11.

Example 3

Figure 12:
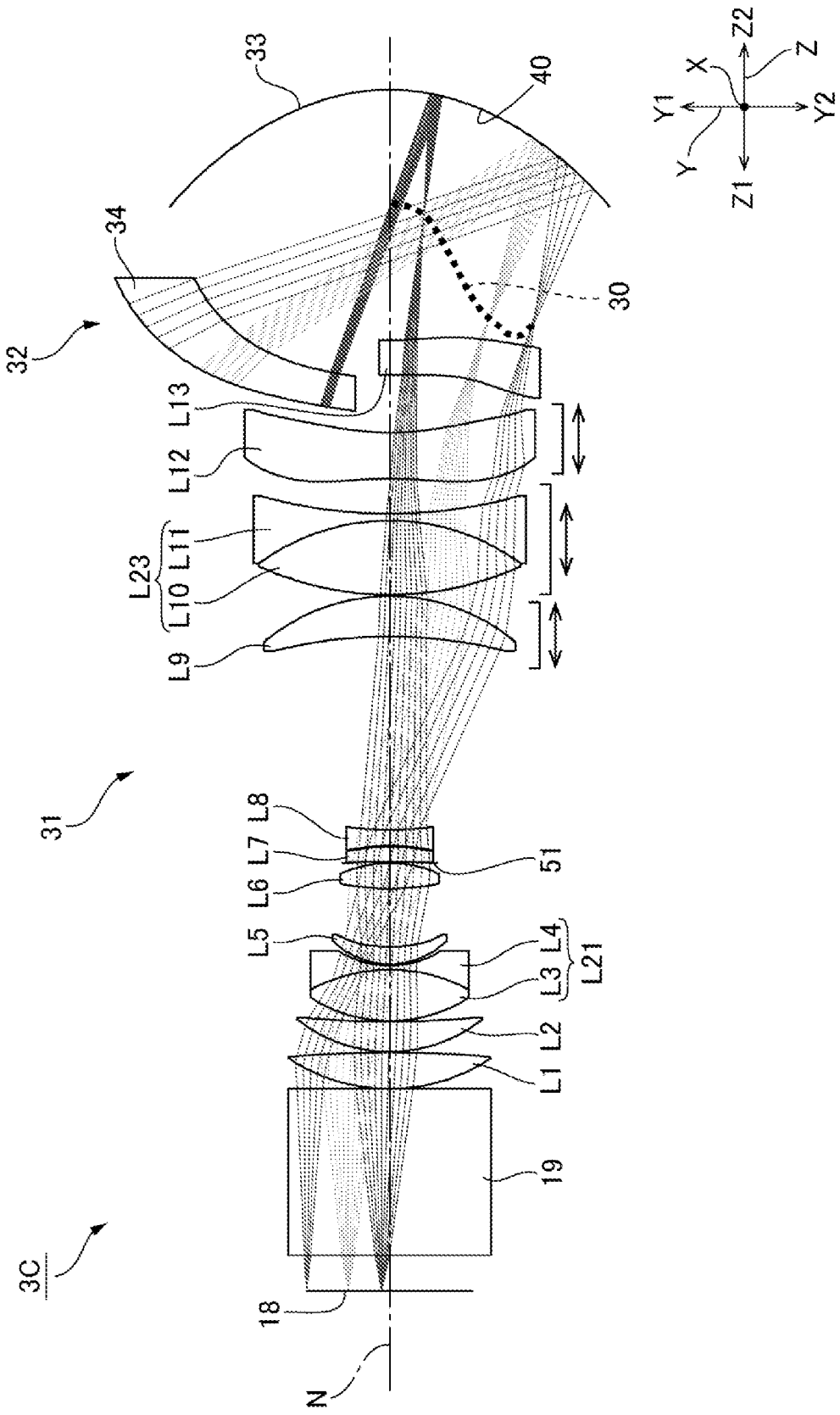
FIG. 12 is a beam diagram showing beams passing through the projection system according to Example 3.

FIG. 12 is a beam diagram showing beams passing through a projection system 3C according to Example 3. The projection system 3C according to the present example is formed of a first optical system 31 and a second optical system 32 sequentially arranged from the reduction side toward the enlargement side, as shown in FIG. 12. The second optical system 32 is disposed on an optical axis N of the first optical system 31.

The first optical system 31 is a refractive optical system. The first optical system 31 is formed of thirteen lenses L1 to L13. The lenses L1 to L13 are arranged in the presented order from the reduction side toward the enlargement side. A diaphragm 51 is disposed between the lens L6 and the lens L7.

The lens L5 has aspherical shapes at opposite sides. The lens L8 has aspherical shapes at opposite sides. The lens L12 (third lens) has aspherical shapes at opposite sides. The lens L13 (second lens) has aspherical shapes at opposite sides. The lens L3 and the lens L4 are bonded to each other into a cemented doublet L21. The lens L10 and the lens L11 are bonded to each other into a cemented doublet L22.

The second optical system 32 includes an optical element 33 and a first lens 34. The optical element 33 and the first lens 34 are arranged in the presented order from the reduction side toward the enlargement side. The optical element 33 has a reflection surface 40, which faces the reduction side. The reflection surface 40 has a concave shape recessed in the second direction Z2. The reflection surface 40 has an aspherical shape. The reflection surface 40 is located at the lower side Y2 of the optical axis N, as shown in FIG. 12. The reflection surface 40 is formed by providing the outer surface, in the first direction Z1, of the optical element 33 with a reflection coating layer (reflection layer). The reflection surface 40 reflects light at the surface, facing in the direction Z1, of the optical element 33.

The first lens 34 is located at a position shifted from the optical element 33 in the first direction Z1 and disposed at the upper side Y1 of the optical axis N. The first lens 34 has negative power. The first lens 34 has a convex enlargement-side surface and a concave reduction-side surface. The first lens 34 has aspherical shapes at opposite sides.

The liquid crystal panel 18 of the image formation unit 2 is disposed in the reduction-side conjugate plane of the projection system 3C. The screen S is disposed in the enlargement-side conjugate plane of the projection system 3C.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 40. The beams having reached the reflection surface 40 are deflected back in the first direction Z1 towards the upper side Y1. The beams deflected back by the reflection surface 40 cross the optical axis N toward the upper side Y1 and travel toward the first lens 34. The beams passing through the first lens 34 are widened by the first lens 34 and reach the screen S.

The lens L13 of the first optical system 31 is disposed between the reflection surface 40 and the first lens 34 in the direction of the optical axis N. An intermediate image 30 is formed between the lens L13 and the reflection surface 40.

In the projection system 3C, the portion at the reduction side of the first optical system 31 is a telecentric portion.

The projection system 3C has a changeable projection distance. When the projection distance is changed, four lenses of the first optical system 31, the lenses L9 to L12, are moved along the optical axis N for focusing. In the focusing, the lenses L10 and L11 are moved as a unit.

Data on the projection system 3C are listed below,

| | |
|---|---|
| NA | 0.2084 |
| imy | 11.7 mm |
| scy | 1462 mm |
| PD | 378.0 mm |
| M | 125 |
| TR | 0.259 |
| OAL | 172 mm |
| LL | 37.8 mm | where NA represents the numerical aperture of the liquid crystal panel 18, imy represents a first distance from the optical axis N to the largest image height at the liquid crystal panel 18, scy represents a second distance from the optical axis N to the largest image height of the enlarged image projected on the screen S, PD represents a projection distance that is the distance from the first lens 34 to the screen S, M represents a projection magnification that is the quotient of division of the second distance by the first distance, TR represents a throw ratio that is the quotient of division of the projection distance by the second distance, OAL represents the axial inter-surface spacing from the liquid crystal panel 18 to the reflection surface 40, and LL represents the largest radius of the first lens 34.

Data on the lenses of the projection system 3C are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/ Reflection | C |
|---|---|---|---|---|---|---|---|
| 18 | 0 | Spherical | Infinity | 5.1000 | | Refraction | 0.0000 |
| 19 | 1 | Spherical | Infinity | 23.9250 | SBSL7_OHARA | Refraction | 12.0558 |
| | 2 | Spherical | Infinity | 0.0000 | | Refraction | 13.1538 |
| L1 | 3 | Spherical | 25.3616 | 5.2165 | SFPL51_OHARA | Refraction | 13.4219 |
| | 4 | Spherical | −160.4483 | 0.1000 | | Refraction | 13.2933 |
| L2 | 5 | Spherical | 20.5113 | 4.3359 | SFSL5_OHARA | Refraction | 12.0000 |
| | 6 | Spherical | 132.0437 | 0.0000 | | Refraction | 11.5962 |
| | 7 | Spherical | Infinity | 0.1000 | | Refraction | 11.9120 |
| L3 | 8 | Spherical | 20.3053 | 7.3344 | SBSL7_OHARA | Refraction | 10.1626 |
| L4 | 9 | Spherical | −23.1488 | 0.6000 | TAFD25_HOYA | Refraction | 8.3549 |
| | 10 | Spherical | 13.5441 | 0.2000 | | Refraction | 7.2414 |

-continued

| Reference character | Surface number | Shape | R | D | Glass material | Refraction/Reflection | C |
|---|---|---|---|---|---|---|---|
| L5 | 11 | Aspherical | 10.7115 | 2.4947 | LBAL35_OHARA | Refraction | 7.2839 |
|  | 12 | Aspherical | 21.0609 | 8.3786 |  | Refraction | 6.9453 |
| L6 | 13 | Spherical | 34.9176 | 3.6553 | SFSL5_OHARA | Refraction | 6.3040 |
|  | 14 | Spherical | −16.1488 | 0.0364 |  | Refraction | 6.0810 |
| 51 | 15 | Spherical | Infinity | 0.1000 |  | Refraction | 5.5409 |
| L7 | 16 | Spherical | −371.7544 | 2.2081 | STIH53_OHARA | Refraction | 5.5362 |
|  | 17 | Spherical | −27.0329 | 0.1512 |  | Refraction | 5.4751 |
| L8 | 18 | Aspherical | −23.1991 | 2.3150 | LLAM60_OHARA | Refraction | 5.4355 |
|  | 19 | Aspherical | 89.7692 | Variable spacing 1 |  | Refraction | 5.5698 |
| L9 | 20 | Spherical | −64.9866 | 5.7941 | STIM22_OHARA | Refraction | 15.7747 |
|  | 21 | Spherical | −27.0076 | Variable spacing 2 |  | Refraction | 16.5319 |
| L10 | 22 | Spherical | 43.6185 | 10.6351 | STIL25_OHARA | Refraction | 17.8154 |
| L11 | 23 | Spherical | −30.6037 | 1.0000 | STIH6_OHARA | Refraction | 17.7153 |
|  | 24 | Spherical | 66.9444 | Variable spacing 3 |  | Refraction | 17.8736 |
| L12 | 25 | Aspherical | −49.3948 | 6.5927 | 'Z-E48R' | Refraction | 19.0969 |
|  | 26 | Aspherical | 33.1964 | Variable spacing 4 |  | Refraction | 18.5842 |
| L13 | 27 | Aspherical | 198.8399 | 5.0000 | 'Z-E48R' | Refraction | 18.7753 |
|  | 28 | Aspherical | 41.3371 | 35.9841 |  | Refraction | 19.8477 |
| 40 | 29 | Aspherical | −28.5883 | −41.4150 |  | Reflection | 29.2645 |
| 34 | 30 | Aspherical | 38.8043 | −5.0000 | 'Z-E48R' | Refraction | 27.5293 |
|  | 31 | Aspherical | 39.6045 | Variable spacing 5 |  | Refraction | 36.7982 |
| S | 32 | Spherical | Infinity | 0.0000 |  | Refraction | 1983.0341 |

The projection system 3C according to the present example has a changeable projection distance selected from a standard distance, a short distance shorter than the standard distance, and a long distance longer than the standard distance. When the projection distance is changed, four lenses of the first optical system 31, the lenses L9 to L12, are moved along the optical axis N for focusing. When the focusing is performed so as to change the projection distance from the short distance to the long distance, the lens L9 moves along the optical axis N toward the enlargement side. In the same focusing operation, the lenses L10 and L11 move along the optical axis N toward the enlargement side. In the same focusing operation, the lens L12 moves along the optical axis N toward the enlargement side. In the projection system 3C according to the present example, the lens L13 is fixed.

The table below shows the variable spacings 1, 2, 3, 4, and 5 at the projection distances where the focusing is performed. The variable spacing 1 is the axial inter-surface spacing between the lens L8 and the lens L9. The variable spacing 2 is the axial inter-surface spacing between the lens L9 and the lens L10. The variable spacing 3 is the axial inter-surface spacing between the lens L11 and the lens L12. The variable spacing 4 is the axial inter-surface spacing between the lens L12 and the lens L13. The variable spacing 5 is the projection distance.

|  | Standard distance | Short distance | Long distance |
|---|---|---|---|
| Variable spacing 1 | 27.7058 | 27.3443 | 27.9475 |
| Variable spacing 2 | 0.2085 | 0.0000 | 0.4035 |
| Variable spacing 3 | 5.0259 | 5.2821 | 4.8227 |
| Variable spacing 4 | 8.2762 | 8.5655 | 8.0181 |
| Variable spacing 5 | −379.0000 | −297.0000 | −524.0000 |

The aspherical coefficients are listed below.

| Surfaces number | S11 | S12 | S18 | S19 |
|---|---|---|---|---|
| Radius of curvature (R) | 10.7115 | 21.0609 | −23.1991 | 89.7692 |
| Conic constant (K) | 2.69624E−01 | 4.78408E+00 | −1 | −90 |
| Fourth-order | −7.67687E−05 | 5.05163E−05 | 1.47441E−04 | 2.11126E−04 |
| Sixth-order | −5.77986E−07 | −3.02482E−07 | −2.37490E−06 | −2.24828E−06 |
| Eighth-order | −4.01080E−09 | −4.23268E−09 | 1.45245E−08 | 1.46576E−08 |
| Tenth-order |  | 5.29887E−11 |  |  |

-continued

| Surface number | S25 | S26 | S27 | S28 |
|---|---|---|---|---|
| Radius of curvature (R) | −49.3948 | 33.1964 | 198.8399 | 41.3371 |
| Conic constant (K) | 0 | 0 | 90 | 0.00000E+00 |
| Fourth-order | 6.80021E−05 | −4.70087E−05 | −6.65376E−05 | −1.21300E−04 |
| Sixth-order | −9.65755E−08 | 1.44566E−07 | −7.25627E−09 | 4.65229E−07 |
| Eighth-order | 7.76122E−11 | −3.72543E−10 | 6.19846E−10 | −1.09606E−09 |
| Tenth-order | 2.18093E−14 | 4.76925E−13 | −1.08500E−12 | 1.26985E−12 |
| Twelfth-order | | | 3.76822E−16 | 2.28175E−16 |
| Fourteenth-order | | | | −1.41383E−18 |

| Surface number | S29 | S30 | S31 |
|---|---|---|---|
| Radius of curvature (R) | −28.5883 | 38.8043 | 39.60445722 |
| Conic constant (K) | −1.00000E+00 | 4.72790E−01 | −0.611371609 |
| Fourth-order | 3.91548E−06 | −1.70359E−05 | −2.40495E−05 |
| Sixth-order | −1.20322E−08 | 8.73558E−08 | 5.12452E−08 |
| Eighth-order | 2.02386E−11 | −2.61450E−10 | −6.11798E−11 |
| Tenth-order | −2.19615E−14 | 5.37788E−13 | 4.72800E−14 |
| Twelfth-order | 1.28670E−17 | −6.50975E−16 | −2.21909E−17 |
| Fourteenth-orde | −3.20304E−21 | 4.05800E−19 | 5.45183E−21 |
| Sixteenth-order | | −9.14385E−23 | −3.94213E−25 |

The projection system 3C according to the present example satisfies all Conditional Expressions (1) and (2) below, $$TR \leq 0.3 \qquad (1)$$

$$35 \leq (OAL/imy) \times (LL/imy) \times TR \times (1/NA) \leq 60 \qquad (2)$$

where OAL represents the axial inter-surface spacing from the liquid crystal panel 18 to the reflection surface 40, imy represents the first distance from the optical axis N to the largest image height at the liquid crystal panel 18, LL represents the largest radius of the first lens 34, TR represents the throw ratio, which is the quotient of division of the projection distance by the second distance from the optical axis N to the largest image height of the enlarged image projected on the screen S, and NA represents the numerical aperture of the liquid crystal panel 18.

In the present example, the values described above are listed below.

| | |
|---|---|
| OAL | 172 mm |
| imy | 11.7 mm |
| LL | 37.8 mm |
| TR | 0.259 |
| NA | 0.2084 |

TR=0.259 is provided from the table shown above, so that Conditional Expression (1) is satisfied. (OAL/imy)×(LL/imy)×TR×(1/NA)=59 is satisfied, so that Conditional Expression (2) is satisfied.

Effects and Advantages

In the projection system 3C according to the present example, the reflection surface 40 is provided with a reflection coating layer (reflection layer). The projection system 3C according to the present example can therefore provide the same effects and advantages as those provided by Example 1.

In the projection system 3C according to the present example, the lens L13 (second lens) disposed at a position closest to the enlargement side in the first optical system 31 is formed as a lens separate from the first lens 34. The lens L13 is disposed between the reflection surface 40 and the first lens 34 in the direction of the optical axis N. That is, the lens L13 disposed at a position closest to the enlargement side in the first optical system 31 is disposed inside the second optical system 32 in the direction of the optical axis N, so that the distance between the lens L13 and the reflection surface 40 decreases. The projection system 3C according to the present example can therefore provide the same effects and advantages as those provided by Example 1.

In the projection system 3C according to the present example, the first optical system 31 includes the lens L13 (second lens) and the lens L12 (third lens), which is disposed adjacent to the lens L13 and shifted therefrom toward the reduction side. That is, the lens L13 disposed at a position closest to the enlargement side in the first optical system 31 is disposed inside the second optical system 32 in the direction of the optical axis N, so that the distance between the lens L13 and the reflection surface 40 decreases. In the projection system 3C according to the present example, focusing that causes the projection distance to be changed from the short distance to the long distance is performed by moving the lens L12 toward the enlargement side in the direction of the optical axis N. The projection system 3C, in which the lens L12, which corrects a variety of aberrations on an image height basis, is moved in the direction of the optical axis N, therefore allows suppression of occurrence of the variety of aberrations during focusing. Furthermore, in a configuration in which a lens having no aspherical shape is moved in the direction of the optical axis N for focusing, an aspherical lens that corrects a variety of aberrations needs to be separately prepared. In contrast, the present example, in which the lens L12, which moves during focusing, has an aspherical shape, allows reduction in the size of the entire projection system.

The lens L13 is fixed in the direction of the optical axis N. The lens L13, which is the second lens, is disposed between the reflection surface 40 and the first lens 34. Therefore, when the lens L13 is moved in the direction of the optical axis N for focusing, the mechanism that moves the lens L13 is complicated, resulting in an increase in manufacturing cost. The manufacturing cost of the projection system 3C according to the present example can therefore be suppressed as compared with the manufacturing cost of the projection system 3A according to Example 1, in which the lens L17, which is the second lens, is moved in the direction of the optical axis N.

The first optical system 31 further includes the cemented doublet L22 at the enlargement side of the diaphragm 51. The chromatic aberrations can therefore be corrected well.

Figure 13:
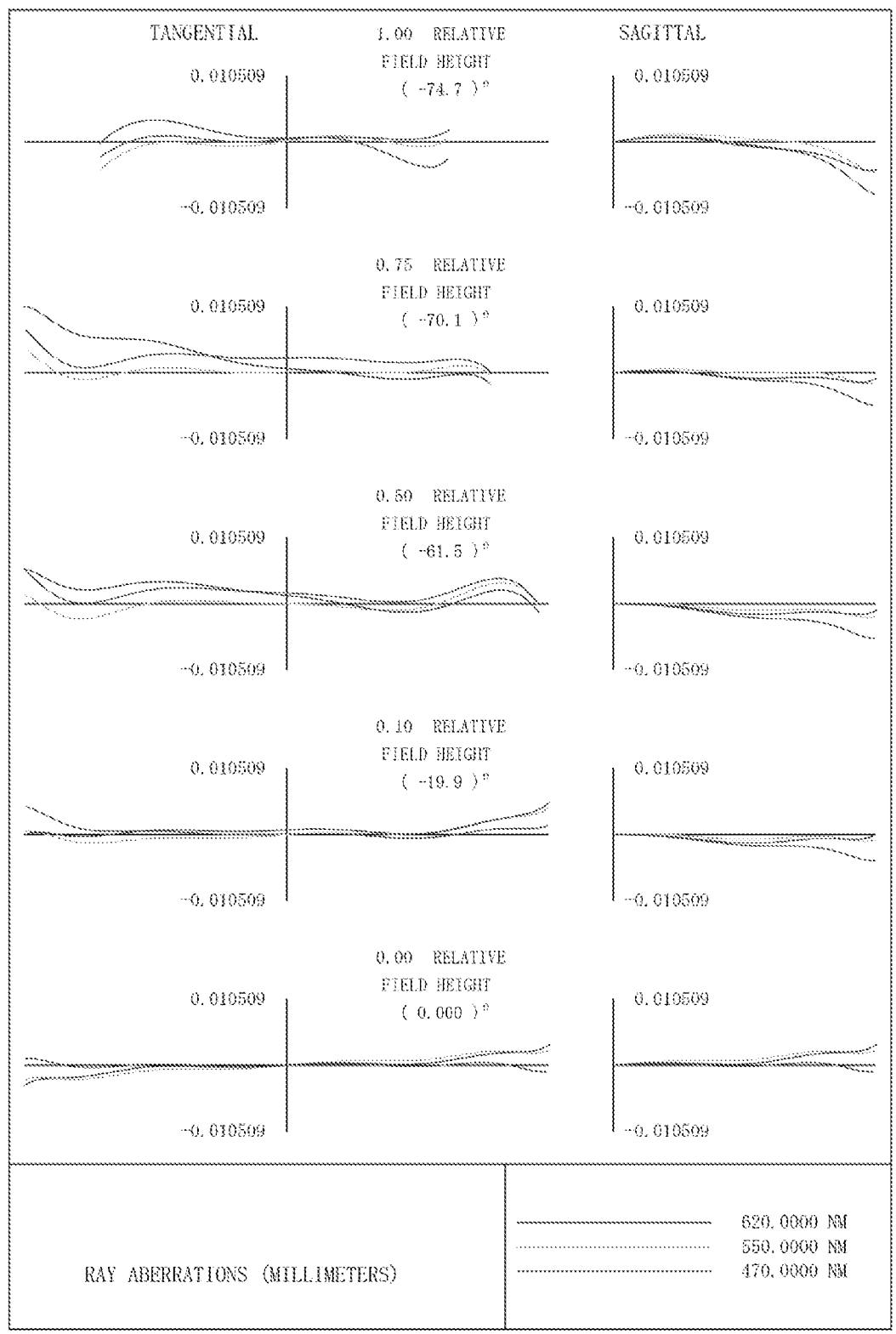
FIG. 13 shows the lateral aberrations produced by the projection system according to Example 3 set at the standard distance.
Figure 14:
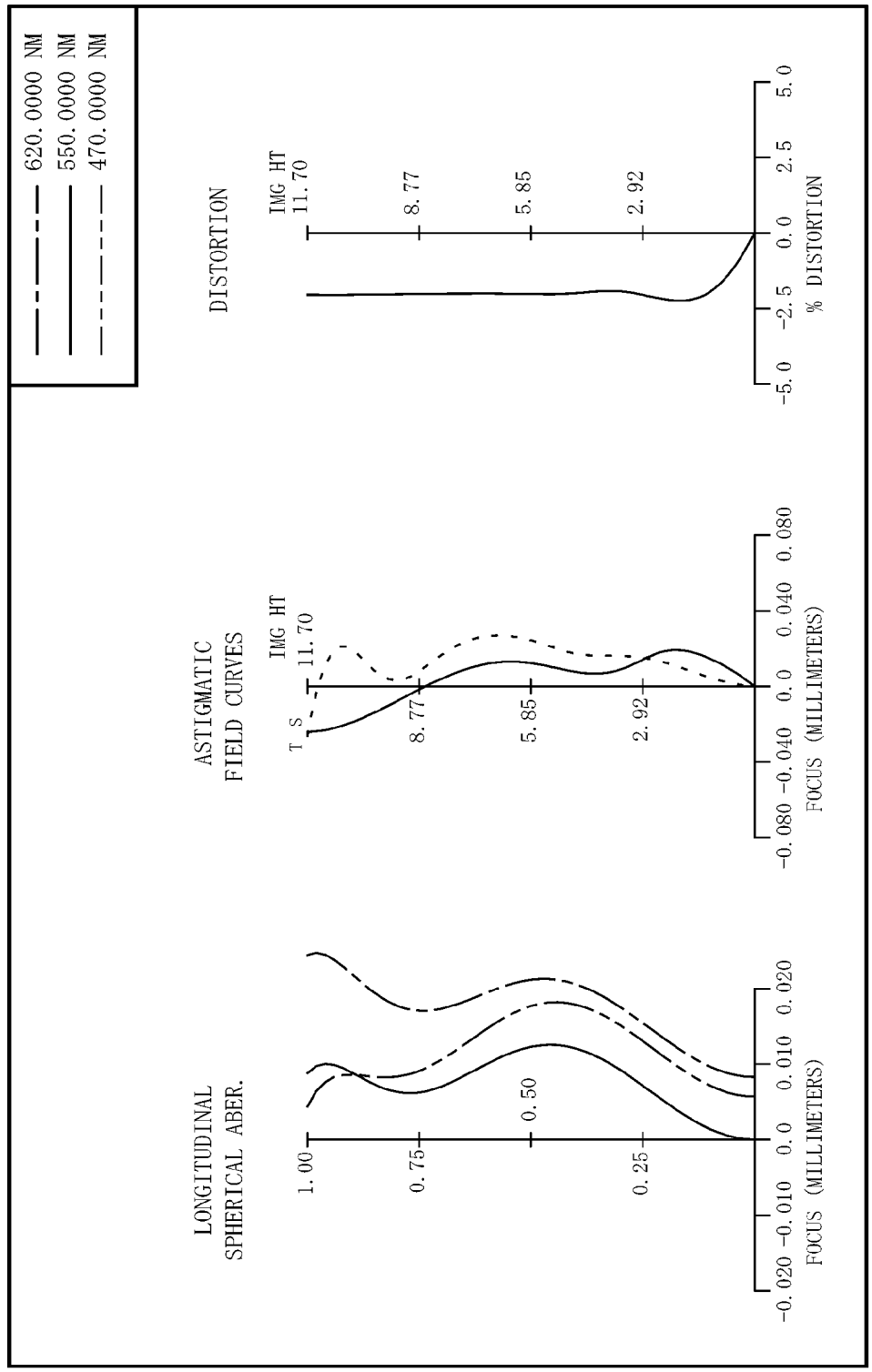
FIG. 14 shows the spherical aberration, astigmatism, and distortion produced by the projection system according to Example 3 set at the standard distance.
Figure 15:
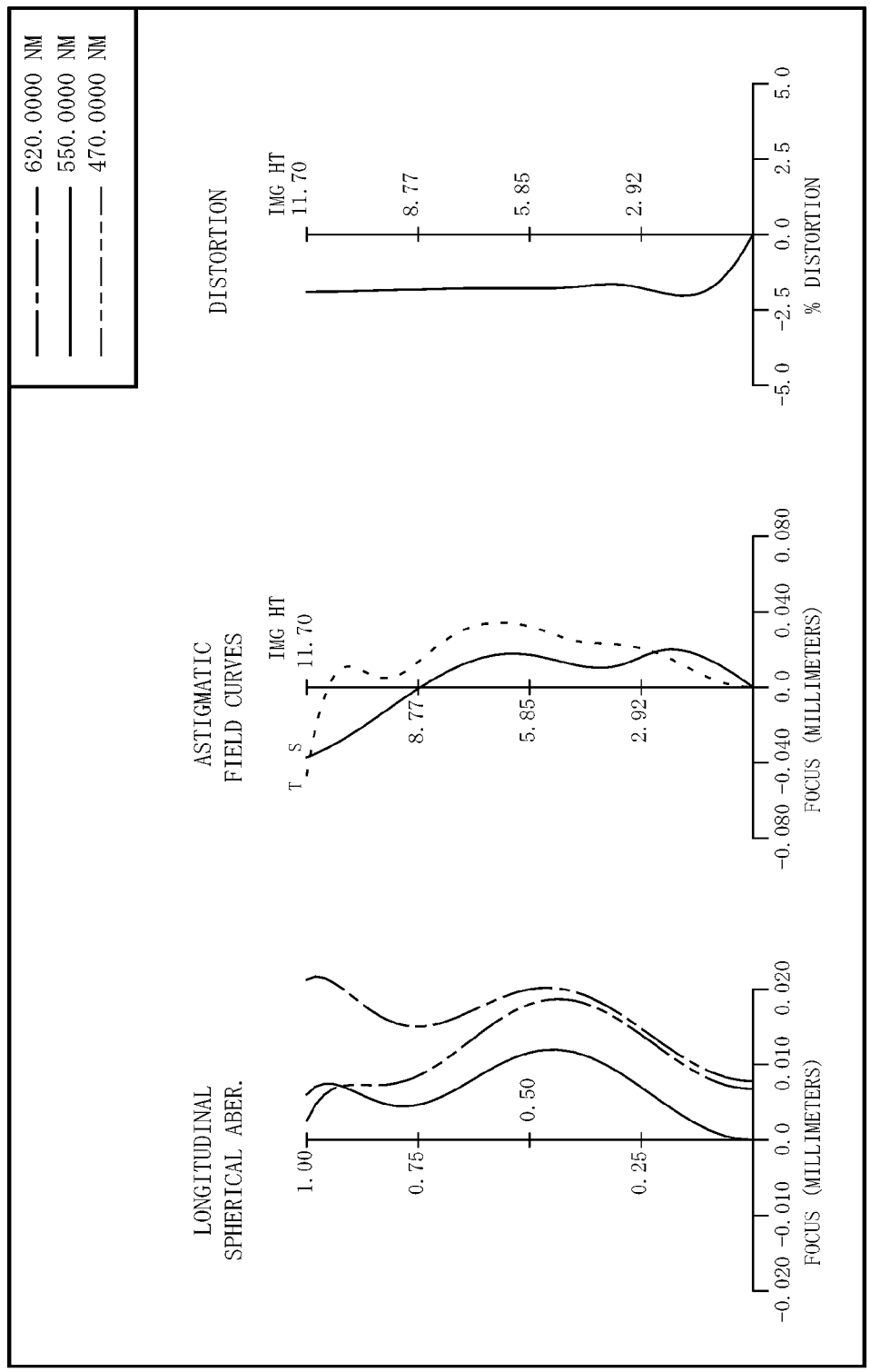
FIG. 15 shows the spherical aberration, astigmatism, and distortion produced by the projection system according to Example 3 set at the short distance.
Figure 16:
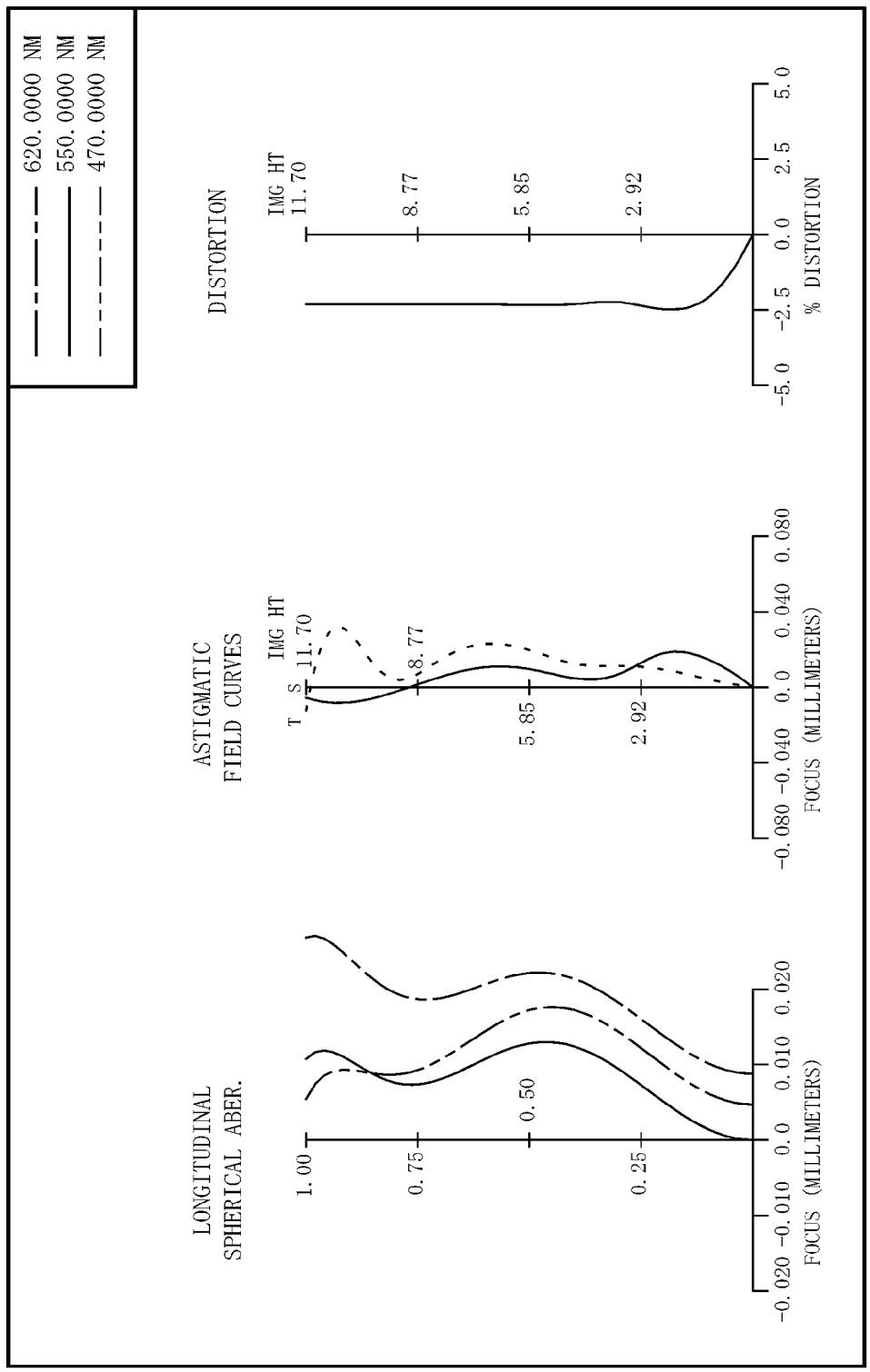
FIG. 16 shows the spherical aberration, astigmatism, and distortion produced by the projection system according to Example 3 set at the long distance.

The projection system 3C according to the present example, which satisfies Conditional Expressions (1) and (2), can provide the same effects and advantages as those provided by the projection system 3A according to Example 1. FIG. 13 shows the lateral aberrations produced by the projection system 3C set at the standard distance. FIG. 14 shows the spherical aberration, astigmatism, and distortion produced by the projection system 3C set at the standard distance. FIG. 15 shows the spherical aberration, astigmatism, and distortion produced by the projection system 3C set at the short distance. FIG. 16 shows the spherical aberration, astigmatism, and distortion produced by the projection system 3C set at the long distance. The projection system 3C according to the present example produces an enlarged image having suppressed aberrations, as shown in FIGS. 13 to 16.

Example 4

Figure 17:
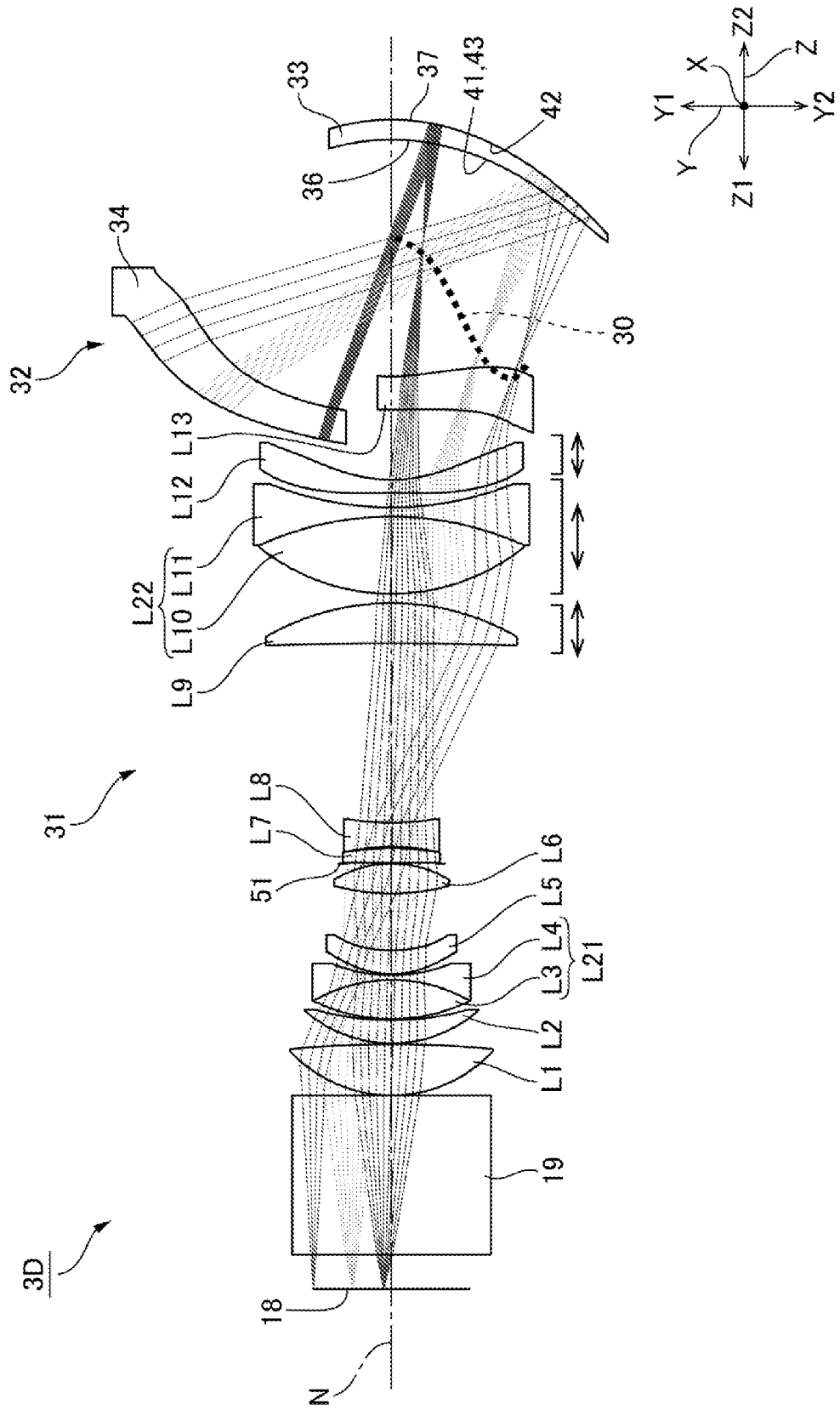
FIG. 17 is a beam diagram showing beams passing through the projection system according to Example 4.

FIG. 17 is a beam diagram showing beams passing through a projection system 3D according to Example 4. The projection system 3D according to the present example is formed of a first optical system 31 and a second optical system 32 sequentially arranged from the reduction side toward the enlargement side, as shown in FIG. 17. The second optical system 32 is disposed on an optical axis N of the first optical system 31.

The first optical system 31 is a refractive optical system. The first optical system 31 is formed of thirteen lenses L1 to L13. The lenses L1 to L13 are arranged in the presented order from the reduction side toward the enlargement side. A diaphragm 51 is disposed between the lens L6 and the lens L7.

The lens L5 has aspherical shapes at opposite sides. The lens L8 has aspherical shapes at opposite sides. The lens L12 (third lens) has aspherical shapes at opposite sides. The lens L13 (second lens) has aspherical shapes at opposite sides. The lens L3 and the lens L4 are bonded to each other into a cemented doublet L21. The lens L10 and the lens L11 are bonded to each other into a cemented doublet L22.

The second optical system 32 includes an optical element 33 and a first lens 34. The optical element 33 and the first lens 34 are arranged in the presented order from the reduction side toward the enlargement side. The optical element 33 has a first surface 36, which faces the reduction side, and a second surface 37, which faces the side opposite from the first surface 36. The optical element 33 has a reflection coating layer at the second surface 37. The first surface 36 has a concave shape. The second surface 37 has a convex shape. The optical element 33 has a first transmission surface 41, a reflection surface 42, and a second transmission surface 43 sequentially arranged from the reduction side toward the enlargement side. The first transmission surface 41 is provided at the first surface 36. The first transmission surface 41 has a concave shape. The reflection surface 42 is the reflection coating layer and has a concave shape to which the surface shape of the second surface 37 has been transferred. The reflection surface 42 reflects light within the optical element 33. The second transmission surface 43 is provided at the first surface 36. The second transmission surface 43 has a concave shape. The first transmission surface 41, the reflection surface 42, and the second transmission surface 43 each have an aspherical shape. The first transmission surface 41, the reflection surface 42, and the second transmission surface 43 are located at the lower side Y2 of the optical axis N, as shown in FIG. 17.

The first lens 34 is located at a position shifted from the optical element 33 in the first direction Z1 and disposed at the upper side Y1 of the optical axis N. The first lens 34 has negative power. The first lens 34 has a convex enlargement-side surface and a concave reduction-side surface. The first lens 34 has aspherical shapes at opposite sides.

The liquid crystal panel 18 of the image formation unit 2 is disposed in the reduction-side conjugate plane of the projection system 3D. The screen S is disposed in the enlargement-side conjugate plane of the projection system 3D.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are thus incident on the first transmission surface 41 of the optical element 33, which forms the second optical system 32.

The beams having entered the optical element 33 via the first transmission surface 41 travel toward the reflection surface 42. The beams having reached the reflection surface 42 are deflected back in the first direction Z1 towards the upper side Y1. The beams deflected back by the reflection surface 42 travel toward the second transmission surface 43. The beams having exited via the second transmission surface 43 cross the optical axis N toward the upper side Y1 and travel toward the first lens 34. The beams passing through the first lens 34 are widened by the first lens 34 and reach the screen S.

The lens L13 of the first optical system 31 is disposed between the reflection surface 42 and the first lens 34 in the direction of the optical axis N. An intermediate image 30 is formed between the lens L13 and the reflection surface 42.

In the projection system 3D, the portion at the reduction side of the first optical system 31 is a telecentric portion.

The projection system 3D has a changeable projection distance. When the projection distance is changed, four lenses of the first optical system 31, the lenses L9 to L12, are moved along the optical axis N for focusing.

Data on the projection system 3D are listed below,

| | |
|---|---|
| NA | 0.25 |
| imy | 11.7 mm |
| scy | 1463 mm |
| PD | 376.0 mm |
| M | 125 |
| TR | 0.257 |
| OAL | 175 mm |
| LL | 40.0 mm | where NA represents the numerical aperture of the liquid crystal panel 18, imy represents a first distance from the optical axis N to the largest image height at the liquid crystal panel 18, scy represents a second distance from the optical axis N to the largest image height of the enlarged image projected on the screen S, PD represents a projection distance that is the distance from the first lens 34 to the screen S, M represents a projection magnification that is the quotient of division of the second distance by the first distance, TR represents a throw ratio that is the quotient of division of the projection distance by the second distance, OAL represents the axial inter-surface spacing from the liquid crystal panel 18 to the reflection surface 42, and LL represents the largest radius of the first lens 34.

Data on the lenses of the projection system 3D are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

The projection system 3D according to the present example has a changeable projection distance selected from a standard distance, a short distance shorter than the standard distance, and a long distance longer than the standard distance. When the projection distance is changed, four lenses of the first optical system 31, the lenses L9 to L12, are moved along the optical axis N for focusing. When the focusing is performed so as to change the projection distance from the short distance to the long distance, the lens L9 moves along the optical axis N toward the reduction side. In the same focusing operation, the lenses L10 and L11 move along the optical axis N toward the enlargement side. In the same focusing operation, the lens L12 moves along the optical axis N toward the enlargement side. In the projection system 3D according to the present example, the lens L13 is fixed.

The table below shows the variable spacings 1, 2, 3, 4, and 5 at the projection distances where the focusing is performed. The variable spacing 1 is the axial inter-surface spacing between the lens L8 and the lens L9. The variable spacing 2 is the axial inter-surface spacing between the lens L9 and the lens L10. The variable spacing 3 is the axial inter-surface spacing between the lens L11 and the lens L12. The variable spacing 4 is the axial inter-surface spacing between the lens L12 and the lens L13. The variable spacing 5 is the projection distance.

| Reference character | Surface number | Shape | R | D | Glass material | Refraction/Reflection | C |
|---|---|---|---|---|---|---|---|
| 18 | 0 | Spherical | Infinity | 5.1000 | | Refraction | 0.0000 |
| 19 | 1 | Spherical | Infinity | 23.9250 | SBSL7_OHARA | Refraction | 12.2082 |
| | 2 | Spherical | Infinity | 0.0000 | | Refraction | 13.7743 |
| L1 | 3 | Spherical | 20.7308 | 7.6535 | SFPL51_OHARA | Refraction | 14.3491 |
| | 4 | Spherical | −160.5725 | 0.1403 | | Refraction | 14.0489 |
| L2 | 5 | Spherical | 19.8009 | 3.4530 | SFSL5_OHARA | Refraction | 12.0000 |
| | 6 | Spherical | 42.1883 | 0.0000 | | Refraction | 11.4760 |
| | 7 | Spherical | Infinity | 0.1846 | | Refraction | 12.5433 |
| L3 | 8 | Spherical | 26.7793 | 5.8661 | SBSL7_OHARA | Refraction | 10.8722 |
| L4 | 9 | Spherical | −23.4816 | 0.7000 | TAFD25_HOYA | Refraction | 10.1298 |
| | 10 | Spherical | 23.8348 | 0.2000 | | Refraction | 8.9729 |
| L5 | 11 | Aspherical | 14.1866 | 3.5452 | LBAL35_OHARA | Refraction | 8.8797 |
| | 12 | Aspherical | 23.2921 | 8.5134 | | Refraction | 8.1796 |
| L6 | 13 | Spherical | 33.2276 | 4.4787 | SFSL5_OHARA | Refraction | 7.8479 |
| | 14 | Spherical | −16.5041 | 0.0000 | | Refraction | 7.6677 |
| 51 | 15 | Spherical | Infinity | 0.1000 | | Refraction | 6.6414 |
| L7 | 16 | Spherical | 846.5448 | 2.2054 | STIH53_OHARA | Refraction | 6.6229 |
| | 17 | Spherical | −40.4470 | 0.2313 | | Refraction | 6.4863 |
| L8 | 18 | Aspherical | −25.5044 | 3.6042 | LLAM60_OHARA | Refraction | 6.4792 |
| | 19 | Aspherical | 59.3482 | Variable spacing 1 | | Refraction | 6.1272 |
| L9 | 20 | Spherical | −437.3885 | 6.0000 | STIM22_OHARA | Refraction | 17.0050 |
| | 21 | Spherical | −37.6532 | Variable spacing 2 | | Refraction | 17.5773 |
| L10 | 22 | Spherical | 31.8187 | 11.5532 | STIL25_OHARA | Refraction | 19.3821 |
| L11 | 23 | Spherical | −47.9275 | 1.3832 | STIH6_OHARA | Refraction | 19.2050 |
| | 24 | Spherical | 49.3856 | Variable spacing 3 | | Refraction | 18.3019 |
| L12 | 25 | Aspherical | −177.2317 | 2.0000 | 'Z-E48R' | Refraction | 18.4483 |
| | 26 | Aspherical | 22.7112 | Variable spacing 4 | | Refraction | 17.9293 |
| L13 | 27 | Aspherical | 179.6432 | 5.0000 | 'Z-E48R' | Refraction | 19.9221 |
| | 28 | Aspherical | 27.1594 | 35.4677 | | Refraction | 19.7715 |
| 41 | 29 | Aspherical | −32.3930 | 3.0000 | 'Z-E48R' | Refraction | 30.0301 |
| 42 | 30 | Aspherical | −30.4878 | −3.0000 | 'Z-E48R' | Reflection | 30.7470 |
| 43 | 31 | Aspherical | −32.3930 | −41.1512 | | Refraction | 29.6535 |
| 34 | 32 | Aspherical | 39.4467 | −5.0000 | 'Z-E48R' | Refraction | 35.7473 |
| | 33 | Aspherical | 38.8749 | Variable spacing 5 | | Refraction | 39.9951 |
| S | 34 | Spherical | Infinity | 0.0000 | | Refraction | 1984.0193 |

|  | Standard distance | Short distance | Long distance |
|---|---|---|---|
| Variable spacing 1 | 26.8792 | 27.0101 | 26.6608 |
| Variable spacing 2 | 1.4097 | 0.7506 | 2.2492 |
| Variable spacing 3 | 2.1500 | 2.6303 | 1.5624 |
| Variable spacing 4 | 10.4814 | 10.5279 | 10.4465 |
| Variable spacing 5 | −376.0000 | −295.0000 | −519.0000 |

The aspherical coefficients are listed below.

| Surface number | S11 | S12 | S18 | S19 |
|---|---|---|---|---|
| Radius of curvature (R) | 14.1866 | 23.2921 | 25.5044 | 59.3482 |
| Conic constant (K) | 0.52162588 | 4.313809097 | −1 | −90 |
| Fourth-order | −2.90353E−05 | 1.01864E−04 | 9.38265E−05 | 1.86743E−04 |
| Sixth-order | −2.33563E−07 | −1.24711E−06 |  |  |
|  | −3.97479E−08 | −1.68413E−06 |  |  |
| Eighth-order | −7.08031E−09 | 5.72359E−09 | 9.15280E−09 |  |
|  | −1.14146E−08 |  |  |  |
| Tenth-order |  | 2.69207E−11 |  |  |

| Surface number | S25 | S26 | S27 | S28 |
|---|---|---|---|---|
| Radius of curvature (R) | −177.2317 | 22.7112 | 179.6432 | 27.1594 |
| Conic constant (K) | 0 | 0 | 89.447202 | 0.000000 |
| Fourth-order | 7.96862E−05 | −2.58626E−08 | −6.20694E−05 | −1.51197E−04 |
| Sixth-order | −3.07379E−07 | −1.92895E−07 | 4.44832E−07 | 9.77046E−07 |
| Eighth-order | 6.58543E−10 | 2.75182E−10 | −2.36330E−09 | −4.47460E−09 |
| Tenth-order | −4.83689E−13 | −1.73130E−15 | 5.49541E−12 | 1.16337E−11 |
| Twelfth-order |  |  | −4.88375E−15 | −1.62518E−14 |
| Fourteenth-order |  |  |  | 9.38335E−18 |

| Surface number | S29, S31 | S30 | S32 | S33 |
|---|---|---|---|---|
| Radius of curvature (R) | −32.3930 | −30.4878 | 39.4467 | 38.8749 |
| Conic constant (K) | −1.026766 | −1.000000 | −0.081546 | −0.618360 |
| Fourth-order | 9.61441E−06 | 5.12974E−06 | −1.83922E−05 | −1.83960E−05 |
| Sixth-order | −4.77776E−08 | −1.81978E−08 | 8.40433E−08 | 3.72462E−08 |
| Eighth-order | 1.03751E−10 | 2.96797E−11 | −1.91747E−10 | −5.13686E−11 |
| Tenth-order | −1.17673E−13 | −2.63402E−14 | 2.17884E−13 | 5.06109E−14 |
| Twelfth-order | 6.81981E−17 | 1.12362E−17 | −5.07382E−17 | −3.06209E−17 |
| Fourteenth-order | −1.55320E−20 | −1.48819E−21 | −7.93912E−20 | 1.04462E−20 |
| Sixteenth-order |  |  | 4.02973E−23 | −1.62167E−24 |

In the present example, the values described above are listed below.

| OAL | 175 mm |
|---|---|
| imy | 11.7 mm |
| LL | 40.0 mm |
| TR | 0.257 |
| NA | 0.25 |

The projection system 3D according to the present example satisfies all Conditional Expressions (1) and (2) below, $$TR \leq 0.3 \quad (1)$$

$$35 \leq (OAL/imy) \times (LL/imy) \times TR \times (1/NA) \leq 60 \quad (2)$$

where OAL represents the axial inter-surface spacing from the liquid crystal panel 18 to the reflection surface 42, imy represents the first distance from the optical axis N to the largest image height at the liquid crystal panel 18, LL represents the largest radius of the first lens 34, TR represents the throw ratio, which is the quotient of division of the projection distance by the second distance from the optical axis N to the largest image height of the enlarged image projected on the screen S, and NA represents the numerical aperture of the liquid crystal panel 18.

Furthermore, it is more preferable that the projection system 3D satisfies all Conditional Expressions (1) and (2') below.

$$TR \leq 0.3 \quad (1)$$

$$35 \leq (OAL/imy) \times (LL/imy) \times TR \times (1/NA) \leq 53 \quad (2')$$

TR=0.257 is provided from the table shown above, so that Conditional Expression (1) is satisfied. (OAL/imy)×(LL/imy)×TR×(1/NA)=53 is satisfied, so that Conditional Expression (2) is satisfied.

Effects and Advantages

In the projection system 3D according to the present example, the lens L13 (second lens) disposed at a position closest to the enlargement side in the first optical system 31 is formed as a lens separate from the first lens 34. The lens L13 is disposed between the reflection surface 42 and the first lens 34 in the direction of the optical axis N. That is, the lens L13 disposed at a position closest to the enlargement side in the first optical system 31 is disposed inside the second optical system 32 in the direction of the optical axis N, so that the distance between the lens L13 and the reflection surface 42 decreases. The projection system 3D according to the present example can therefore provide the same effects and advantages as those provided by Example 1.

In the projection system 3D according to the present example, the first optical system 31 includes the lens L13 (second lens) and the lens L12 (third lens), which is disposed adjacent to the lens L13 and shifted therefrom toward the reduction side. The lenses L12 and L13 each have an aspherical shape. In the projection system 3D according to the present example, focusing that causes the projection distance to be changed from the short distance to the long distance is performed by moving the lens L12 toward the enlargement side in the direction of the optical axis N. The projection system 3D, in which the lens L12, which corrects a variety of aberrations on an image height basis, is moved in the direction of the optical axis N, therefore allows suppression of occurrence of the variety of aberrations during focusing. Furthermore, in a configuration in which a lens having no aspherical shape is moved in the direction of the optical axis N for focusing, an aspherical lens that corrects a variety of aberrations needs to be separately prepared. In contrast, the present example, in which the lens L12, which moves during focusing, has an aspherical shape, allows reduction in the size of the entire projection system.

The lens L13 is fixed in the direction of the optical axis N. The lens L13, which is the second lens, is disposed between the reflection surface 42 and the first lens 34. Therefore, when the lens L13 is moved in the direction of the optical axis N for focusing, the mechanism that moves the lens L13 is complicated, resulting in an increase in manufacturing cost. The manufacturing cost of the projection system 3D according to the present example can therefore be suppressed as compared with the manufacturing cost of the projection system 3A according to Example 1, in which the lens L17, which is the second lens, is moved in the direction of the optical axis N.

The first optical system 31 further includes the cemented doublet L22 at the enlargement side of the diaphragm 51. The chromatic aberrations can therefore be corrected well.

Figure 18:
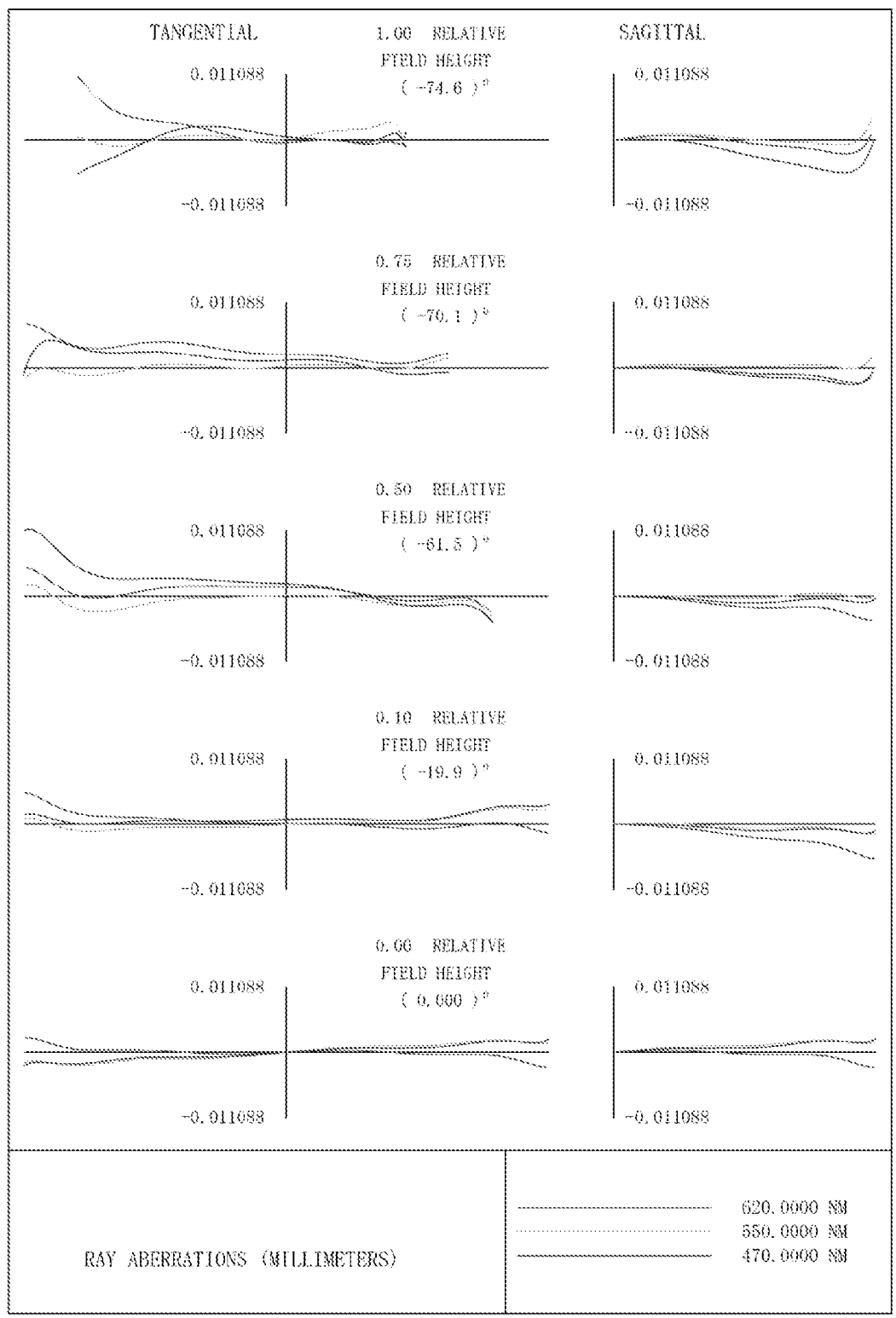
FIG. 18 shows the lateral aberrations produced by the projection system according to Example 4 set at the standard distance.
Figure 19:
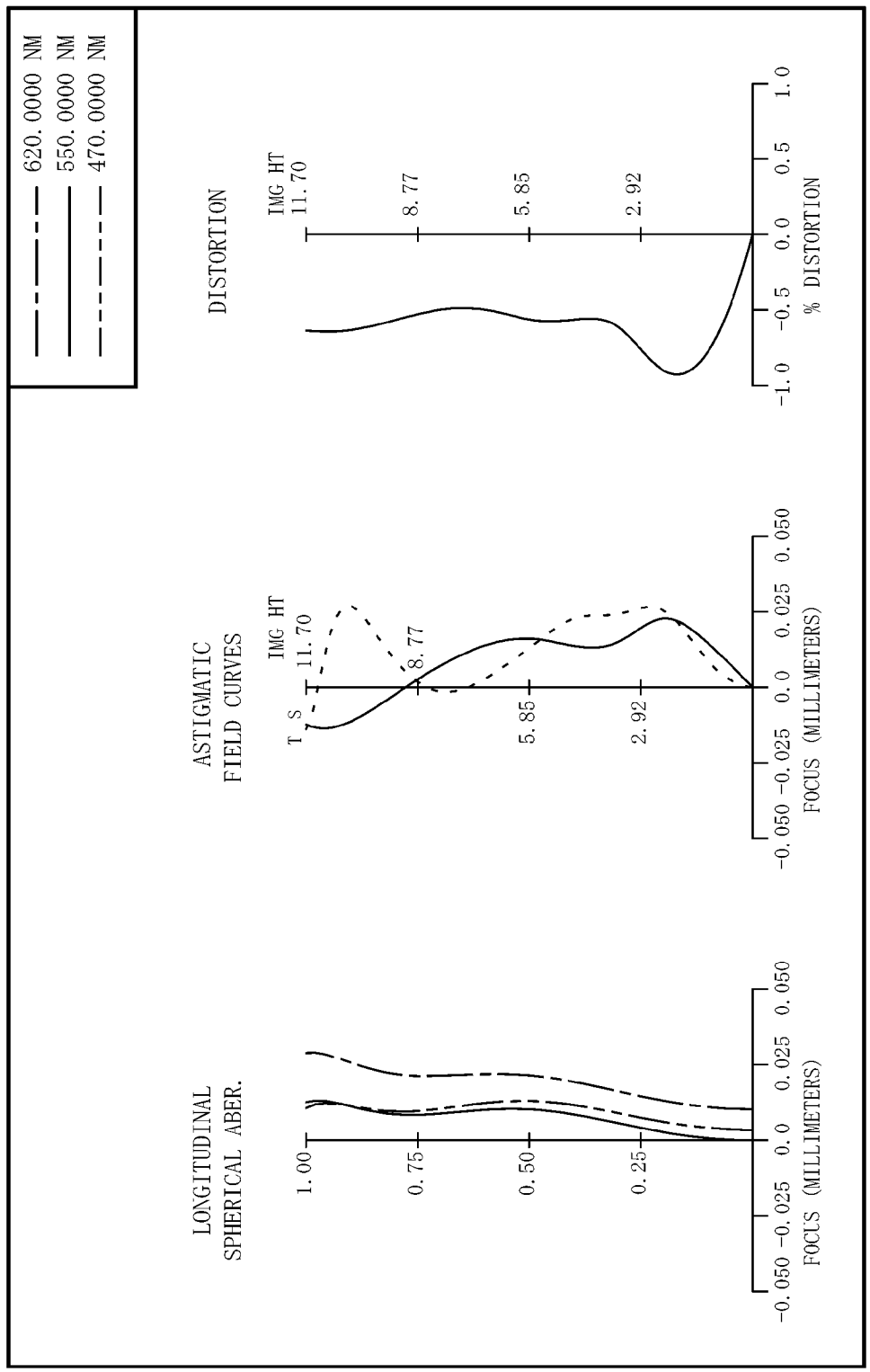
FIG. 19 shows the spherical aberration, astigmatism, and distortion produced by the projection system according to Example 4 set at the standard distance.
Figure 20:
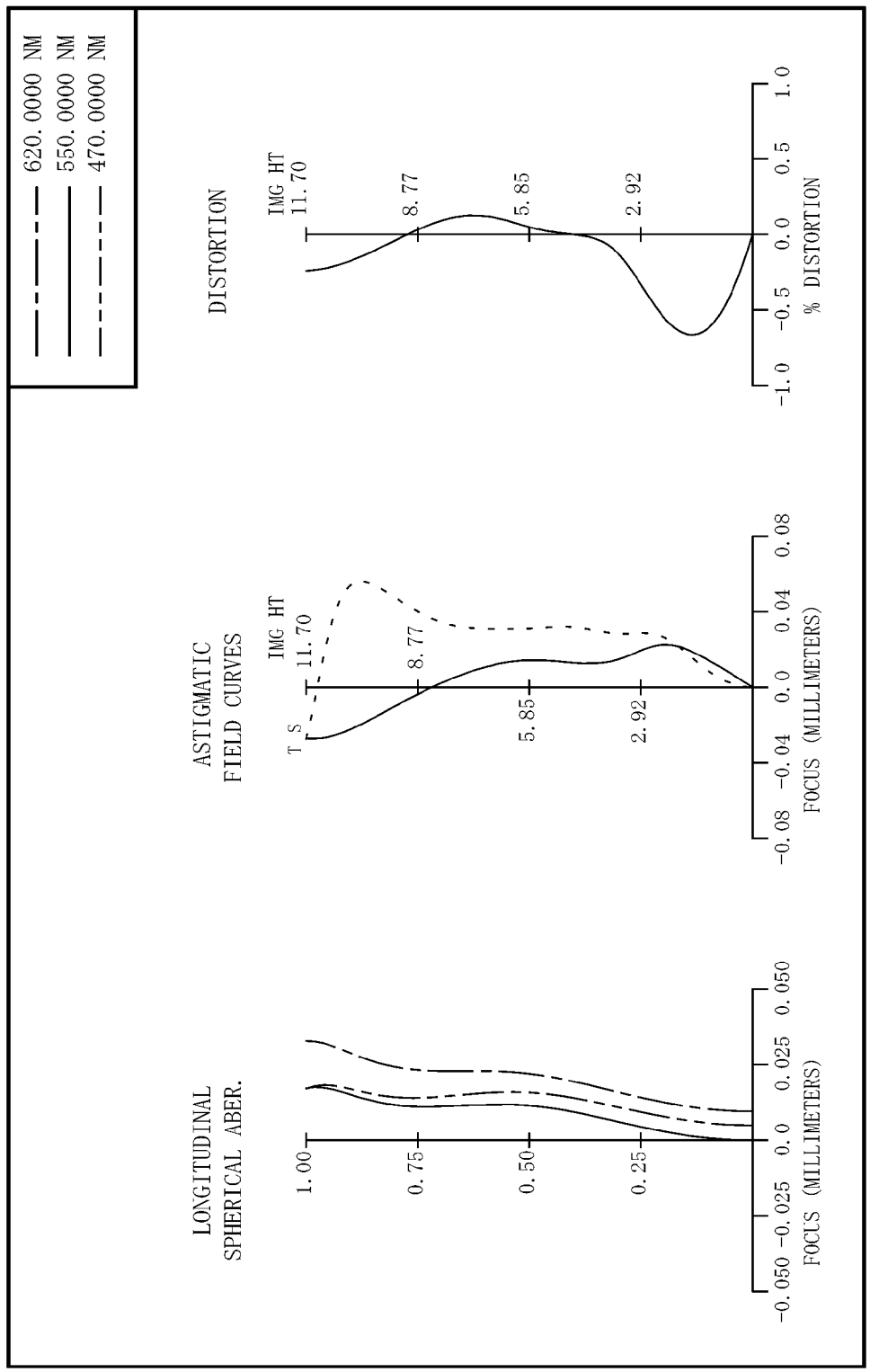
FIG. 20 shows the spherical aberration, astigmatism, and distortion produced by the projection system according to Example 4 set at the short distance.
Figure 21:
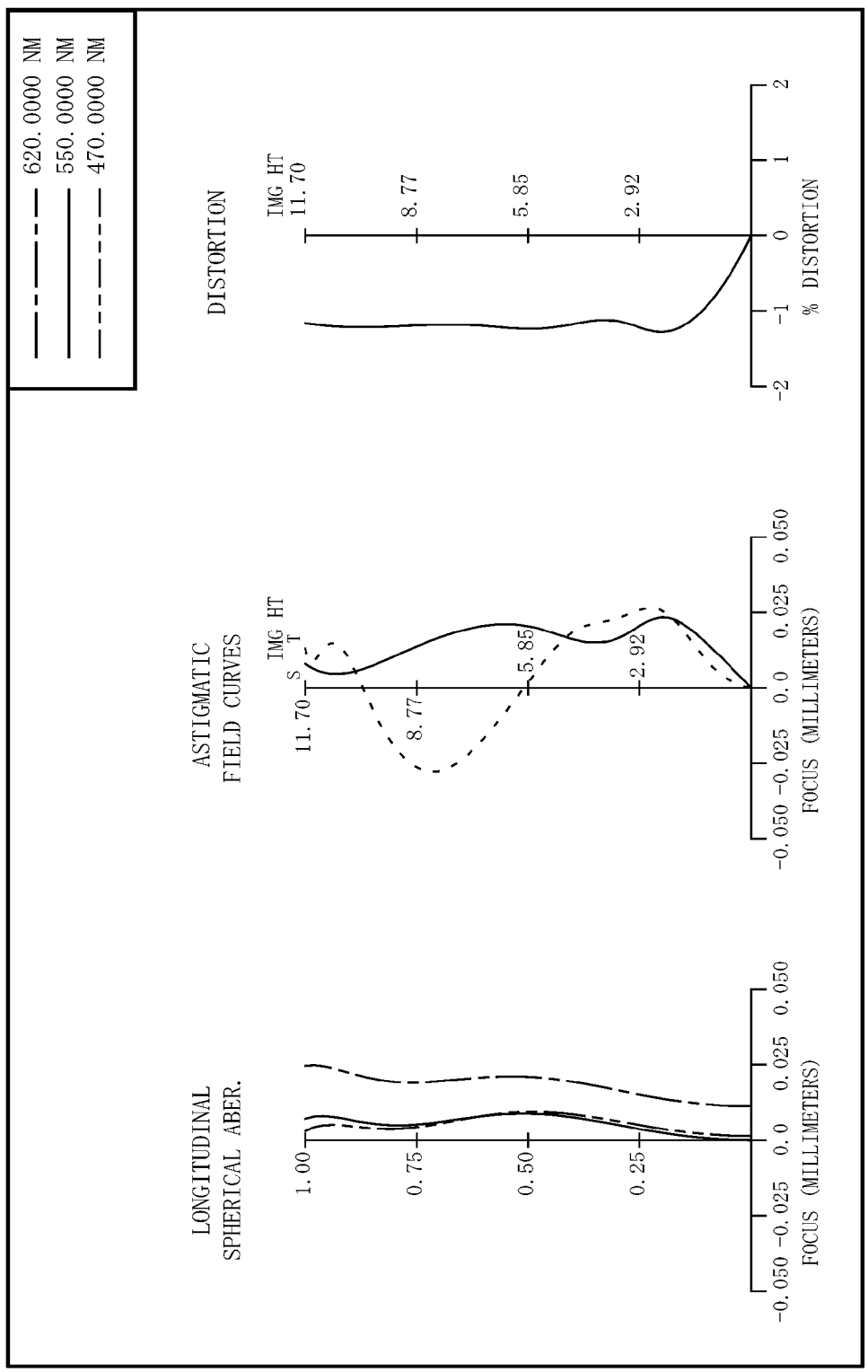
FIG. 21 shows the spherical aberration, astigmatism, and distortion produced by the projection system according to Example 4 set at the long distance.

The projection system 3D according to the present example, which satisfies Conditional Expressions (1) and (2), can provide the same effects and advantages as those provided by the projection system 3A according to Example 1. FIG. 18 shows the lateral aberrations produced by the projection system 3D set at the standard distance. FIG. 19 shows the spherical aberration, astigmatism, and distortion produced by the projection system 3D set at the standard distance. FIG. 20 shows the spherical aberration, astigmatism, and distortion produced by the projection system 3D set at the short distance. FIG. 21 shows the spherical aberration, astigmatism, and distortion produced by the projection system 3D set at the long distance. The projection system 3D according to the present example produces an enlarged image having suppressed aberrations, as shown in FIGS. 18 to 21.

What is claimed is:

1. A projection system for enlarging a projection image formed by an image formation device disposed in a reduction-side conjugate plane and projecting the enlarged image in an enlargement-side conjugate plane, the projection system comprising:
a first optical system and a second optical system sequentially arranged from the reduction side toward the enlargement side,
wherein the first optical system includes a diaphragm,
the second optical system includes an optical element having a concave reflection surface and a first lens having negative power, the optical element and the first lens sequentially arranged from the reduction side toward the enlargement side,
an intermediate image conjugate with the reduction-side conjugate plane and the enlargement-side conjugate plane is formed between the first optical system and the second optical system,
a portion at the reduction side of the first optical system forms a telecentric portion, and
the projection system satisfies all Conditional Expressions (1) and (2) below, $$TR \leq 0.3 \tag{1}$$

$$35 \leq (OAL/imy) \times (LL/imy) \times TR \times (1/NA) \leq 60 \tag{2}$$

where OAL represents an axial inter-surface spacing from the image formation device to the reflection surface, imy represents a first distance from an optical axis to a largest image height at the image formation device, LL represents a largest radius of the first lens, TR represents a throw ratio that is a quotient of division of a projection distance by a second distance from the optical axis to a largest image height of the enlarged image, and NA represents a numerical aperture of the image formation device.

2. The projection system according to claim 1, wherein the reflection surface is provided with a reflection layer.

3. The projection system according to claim 1,
wherein a second lens disposed at a position closest to the enlargement side in the first optical system is formed as a lens separate from the first lens, and
the second lens is disposed between the reflection surface and the first lens in a direction of the optical axis.

4. The projection system according to claim 3,
wherein the first optical system includes the second lens and a third lens that is disposed adjacent to the second lens and shifted therefrom toward the reduction side,
the second and third lenses each have an aspherical shape, and
focusing that causes the projection distance to be changed from a short distance to a long distance is performed by moving the third lens toward the enlargement side in the direction of the optical axis.

5. The projection system according to claim 4, wherein the second lens is fixed in the direction of the optical axis.

6. The projection system according to claim 1, wherein the first optical system includes a cemented doublet on the enlargement side of the diaphragm.

7. A projector comprising:
the projection system according to claim 1; and
the image formation device that forms a projection image in the reduction-side conjugate plane of the projection system.

* * * * *